US010383474B2

(12) United States Patent
Upston et al.

(10) Patent No.: US 10,383,474 B2
(45) Date of Patent: Aug. 20, 2019

(54) COFFEE MACHINE WITH OVERFLOW FEATURE

(71) Applicant: BREVILLE PTY LIMITED, Alexandria, New South Wales (AU)

(72) Inventors: Greg Upston, Ridgewood (AU); Daniel Robert Corkin, Panania (AU); Adam Preston, Coogee (AU); Robert Grassia, Summer Hill (AU)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 0 days.

(21) Appl. No.: 15/015,039

(22) Filed: Feb. 3, 2016

(65) Prior Publication Data
US 2016/0150911 A1 Jun. 2, 2016
US 2019/0090684 A9 Mar. 28, 2019

Related U.S. Application Data

(63) Continuation of application No. 14/116,327, filed as application No. PCT/AU2012/000501 on May 10, 2012, now abandoned.

(30) Foreign Application Priority Data

May 10, 2011 (AU) ................................. 2011901751
Aug. 11, 2011 (AU) ................................. 2011903195
Feb. 21, 2012 (AU) ................................. 2012900647

(51) Int. Cl.
*A47J 31/46* (2006.01)
(52) U.S. Cl.
CPC ............. *A47J 31/46* (2013.01); *A47J 31/462* (2013.01)

(58) Field of Classification Search
CPC .......... A47J 31/44; A47J 31/402; A47J 31/41; A47J 31/465; A47J 31/54; A47J 31/0668; A47J 31/3685; A47J 31/368; A47J 31/36
(Continued)

(56) References Cited

U.S. PATENT DOCUMENTS 4,007,856 A 2/1977 Murphy et al.
4,389,925 A * 6/1983 Piana .................. A47J 31/0668
99/289 R
(Continued)

FOREIGN PATENT DOCUMENTS

CN 2306728 Y 2/1999
CN 1418539 A 5/2003
(Continued)

OTHER PUBLICATIONS

Examination Report No. 1 for Australian Patent Application No. 2017200216, dated Apr. 16, 2018.
(Continued)

*Primary Examiner* — Tu B Hoang
*Assistant Examiner* — Thomas J Ward
(74) *Attorney, Agent, or Firm* — Marshall, Gerstein & Borun LLP

(57) ABSTRACT

A coffee making device has a body with a drip tray and a removable water tank that supplies water to a heat system of the device. The water tank is internal to the device and removable by a user. The body has a fluid refill opening that leads to the tank. The tank includes an overflow channel or conduit that dispenses into the drip tray.

21 Claims, 23 Drawing Sheets

(58) Field of Classification Search
USPC .......... 99/302, 295, 289, 302 R; 122/13 A, 122/14 A; 219/314
See application file for complete search history.

(56) References Cited

U.S. PATENT DOCUMENTS

| | | | |
|---|---|---|---|
| 4,751,941 A * | 6/1988 | van Zijverden | A47J 31/54 126/389.1 |
| 6,269,735 B1 * | 8/2001 | Rolfes | A47J 31/4403 99/279 |
| 6,561,079 B1 | 5/2003 | Muller et al. | |
| 7,523,695 B2 | 4/2009 | Streeter et al. | |
| 8,307,754 B2 | 11/2012 | Ternite et al. | |
| 2008/0041235 A1 | 2/2008 | Kramer et al. | |
| 2008/0148959 A1 * | 6/2008 | Bockbrader | A47J 31/402 99/323.3 |
| 2009/0136639 A1 | 5/2009 | Doglioni Majer et al. | |
| 2010/0047407 A1 | 2/2010 | Carbonini | |
| 2010/0203207 A1 | 8/2010 | Clark et al. | |
| 2011/0041698 A1 * | 2/2011 | Mori | A47J 31/44 99/290 |
| 2011/0163116 A1 | 7/2011 | Dixon | |

FOREIGN PATENT DOCUMENTS

| | | |
|---|---|---|
| CN | 2675006 Y | 2/2005 |
| CN | 101001557 A | 7/2007 |
| CN | 200965388 Y | 10/2007 |
| CN | 101102704 A | 1/2008 |
| CN | 101588741 | 11/2009 |
| CN | 201365830 Y | 12/2009 |
| CN | 102038430 A | 5/2011 |
| CN | 102046276 A | 5/2011 |
| EP | 1501398 B1 | 9/2006 |
| EP | 1731065 A1 | 12/2006 |
| EP | 1867262 A1 | 12/2007 |
| EP | 1949829 A1 | 7/2008 |
| EP | 2314182 A1 | 4/2011 |
| GB | 826833 A | 1/1960 |
| GB | 1 329 427 A | 9/1973 |
| JP | H10248721 A | 9/1998 |
| JP | H11-1206569 A | 8/1999 |
| JP | 2005128751 A | 5/2005 |
| JP | 2008-194076 A | 8/2008 |
| NL | 8103533 A | 2/1983 |
| WO | WO-2006/000961 A2 | 1/2006 |
| WO | WO-2010/023312 A1 | 3/2010 |
| WO | WO-2010/121299 A1 | 10/2010 |
| WO | WO-2011/048078 A2 | 4/2011 |
| WO | WO-2011/140582 A1 | 11/2011 |

OTHER PUBLICATIONS

Extended European Search Report for European Patent Application No. 12782726.9, dated Nov. 11, 2014.
Communication Pursuant to Article 94(3) EPC, dated Mar. 17, 2017.
First Office Action for Chinese Patent Application No. 201280022617.2, dated May 8, 2015.
Second Office Action for Chinese Patent Application No. 201280022617.2, dated Jun. 7, 2016.
Patent Examination Report No. 1 for Australian Patent Application No. 2012253224, dated Aug. 8, 2016.
International Search Report and Written Opinion for PCT/AU2012/000501, dated Jul. 3, 2012.
International Preliminary Report on Patentability for PCT/AU2012/000501, dated Nov. 12, 2013.
Office Action issued in European Patent Application No. 12 782 726.9, dated May 8, 2018.
Office Action issued in Chinese Patent Application No. 20161039122, dated Apr. 24, 2018.
Third Chinese Office Action issued in Chinese Patent Application 201510965223.6, dated Jan. 4, 2019.
Request for Re-Examination of Australian Patent No. 2012253224, dated Jun. 11, 2019.
Jura Impressa E70 E75 Instruction Manual 11/02.
Jura Replacement Water Tank Print.
Internet Forum—Jura E75 Strong Coffee Setting, 2003.
Internet Forum—Jura E75 Steam Problem, Jul. 28, 2010.

* cited by examiner

COFFEE MACHINE WITH OVERFLOW FEATURE

FIELD OF THE INVENTION

The present invention relates to fluid boilers and in particular to regulated control of fluid boilers.

The invention has been developed primarily for use as a controlled boiler method and apparatus of an espresso machine and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Known espresso machine control both the pressure and dose of water delivered in producing a shot of espresso coffee. It will be appreciated that the pressure is typically set to between nine and ten bar. The dose is typically about 30 mL, and is delivered in between twenty to forty seconds.

A pre-infusion stage has been used to wet the coffee grinds to allow expansion within a filter basket, thereby assisting in trapping fine grinds and restricting water from tracking though the filter. To enable wetting without forcing water though the coffee grinds, the water delivered in this pre-infusion stage usually has a pressure between one to five bar.

There is a need for an efficient method and apparatus for providing a dose having a regulated pressure and volume. There is also a need to provide an efficient method and apparatus for enabling an espresso machine water pumps to deliver a controlled low pressure pre-infusion.

Espresso machines are also known to have steam wands. The steam wand omits steam that can be used, for example, to heat and froth milk. In some machines, the steam output is regulated by a valve such as a needle valve. A needle valve provides a variable steam output but must be rotated numerous times when proceeding from a closed state to a fully opened state.

Accordingly, there is also a need for a steam output control that provides greater ease of use than a needle valve.

OBJECT OF THE INVENTION

It is an object of the present invention to overcome or ameliorate at least one of the disadvantages of the prior art, or to provide a useful alternative.

It is an object of some embodiments of the invention in a preferred form to provide an improved coffee machine. It is an object of some embodiments of the invention in a preferred form to provide an improved espresso coffee machine.

It is an object of some embodiments of the invention in a preferred form to provide an espresso machine that can provide a dose having a regulated pressure and volume.

It is an object of other embodiments of the invention in a preferred form to provide an espresso machine that can provide a controlled low pressure pre-infusion.

It is a further object of the invention in a preferred form to provide an espresso machine that represents a reasonable alternative to a needle valve controller for the steam output.

SUMMARY OF THE INVENTION

According to an aspect of the invention there is provided a flow measurement apparatus for measuring a resultant flow delivered by a pump coupled to an over pressure valve, the apparatus comprising:
- a first flow meter for measuring feed flow to the pump;
- a second flow meter for measuring return flow from the over pressure valve; and
- wherein a resultant flow delivered by a pump can be determined by subtracting measured return flow from measured feed flow.

Preferably, resultant flow can be determined (or calculated) in real time, and used to stop the operation of the pump when a suitable dose has been delivered.

According to an aspect of the invention there is provided an espresso machine comprising a flow measurement apparatus as herein disclosed, for measuring a shot dose delivered by a pump coupled to an over pressure valve. Preferably, the espresso machine further comprises a pump power modification module as herein disclosed, for providing pre-infusion.

According to an aspect of the invention there is provided an espresso machine comprising a pump power modification module as herein disclosed, for providing pre-infusion. Preferably, the espresso machine further comprises a flow measurement apparatus as herein disclosed, for measuring a shot dose delivered by a pump coupled to an over pressure valve.

Preferably, the pump power modification module can enable pressure profiling during an espresso production cycle. More preferably, the pressure profile can be preset or user configurable. Most preferably, the pressure profile can take the form of power-time profile indicative of electrical power delivered to a respective pump.

According to an aspect of the invention there is provided a method of flow measurement for measuring a resultant flow delivered by a pump coupled to an over pressure valve, the method comprising the steps of:
- (a) measuring, using a first flow meter, feed flow to the pump;
- (b) measuring, using a second flow meter, return flow from the over pressure valve; and
- (c) calculating resultant flow, at least in part, by subtracting measured return flow from measured feed flow.

Preferably, calculating resultant flow can be performed in real time, and used to stop the operation of the pump when a suitable dose has been delivered.

According to an aspect of the invention there is provided an espresso machine comprising a processor device adapted to perform a method of flow measurement as herein disclosed, for measuring a shot dose delivered by a pump coupled to an over pressure valve.

According to an aspect of the invention there is provided an apparatus for controlling overflow from a fluid reservoir, the apparatus comprising:
- a body;
- a removable fluid reservoir;
- a fluid refill aperture in fluid communication with the reservoir; and
- a drip tray, wherein the reservoir includes a overflow aperture in fluid communication with the drip tray.

According to an aspect of the invention there is provided an espresso machine comprising:
- an espresso machine body;
- a removable water tank;

a water refill aperture located at the front or top of the espresso machine, in fluid communication with the water tank;

a front loading drip tray, wherein the water tank includes a overflow aperture in fluid communication with the drip tray.

Preferably, the water tank is inserted from the rear of the espresso machine body. Alternatively, the water tank is preferably inserted from the side of the espresso machine body.

According to an aspect of the invention there is provided an apparatus for receiving a removable fluid reservoir, the apparatus comprising:

a body; and a removable fluid reservoir, wherein the reservoir includes a lock assembly and a fluid release valve.

According to an aspect of the invention there is provided an espresso machine comprising:

an espresso machine body;

a removable water tank;

wherein the water tank includes a lock assembly and a fluid release valve.

Preferably, the water tank is inserted from the rear of the espresso machine body. Alternatively, the water tank is preferably inserted from the side of the espresso machine body.

Preferably, the water tank includes a overflow aperture in fluid communication with a drip tray.

Preferably, the espresso machine includes a flow measurement apparatus.

According to an aspect of the invention there is provided an apparatus for providing control of a steam output, the apparatus comprising:

a body;

a steam wand assembly coupled to the body and having a steam output;

the output being controlled by a valve that is internal to the body;

the valve being controlled by a rotatable control element.

Preferably, the apparatus further comprising a pump that draws a fluid from a fluid reservoir, and supplies the fluid it to a steam boiler; the boiler supplying steam a solenoid activated valve used to start and stop the flow of steam from the boiler to the wand assembly.

According to an aspect of the invention there is provided an espresso machine comprising:

a steam wand having a steam output;

the output is controlled by a valve that is internal to the espresso machine;

the valve being controlled by a rotating paddle.

Preferably, the valve is a ball valve.

Preferably, a paddle is affixed to a knob.

According to an aspect of the invention there is provided an a steam control apparatus for an espresso machine comprises:

a ball valve in fluid communication with a steam wand;

a hub having a radially extending lever element; the hub being rotatable mounted with respect to the espresso machine; the hub and lever element being operative coupled to the ball valve; and wherein the apparatus can be configured from a fully closed configuration to a fully open configuration by rotation of the hub of less that 180 degrees.

Preferably, the steam control apparatus includes a switch sensor element for providing a data (or lodging) signal to a computing module. More preferably, the data signal is indicative for the apparatus being in a fully open configuration wherein output of the steam wand is in fluid communication with a steam boiler.

Preferably, the valve is a ball valve in fluid communication with the steam wand assembly; and the rotating control element comprises a hub having a radially extending lever element; the hub being rotatably mounted with respect to the body; the hub and lever element being operative coupled to the ball valve; and wherein the apparatus can be configured from a fully closed configuration to a fully open configuration by rotation of the hub.

Preferably, allowable rotation of the control element is less than 180 degrees.

Preferably, the apparatus includes a switch sensor element for providing a data signal to a processor module. More preferably, the data signal is indicative for the apparatus being in a fully open configuration wherein output of the steam wand assembly is in fluid communication with a steam boiler.

Preferably, the apparatus further comprising a pump that draws a fluid from a fluid reservoir, and supplies the fluid it to a steam boiler; the boiler supplying steam a solenoid activated valve used to start and stop the flow of steam from the boiler to the wand assembly. More preferably, the solenoid activated valve is a three way two position solenoid valve used to start and stop the flow of steam from the boiler to the wand assembly.

Preferably, the wand assembly is substantially constructed in plastics so as to isolate heat in a wand nozzle.

Preferably, a temperature sensor element monitors temperature of the wand nozzle. More preferably, the temperature sensor element is a thermistor. Most preferably, the steam wand assembly has an output steam nozzle associated with a thermistor.

Preferably, when the solenoid valve is closed, a steam path is an open flow path to the atmosphere for restricting milk from being siphoned back into the wand assembly. More preferably, the solenoid valve is adapted to supply either unadulterated steam from the boiler, or to allow flow of atmosphere to the venturi.

Preferably, the rotatable control element activates one or more switch element for controlling a steam generation process.

Preferably, the steam wand assembly is associated with a switch element for enabling detection that the steam wand assembly has been returned to a predetermined home position.

Preferably, the apparatus further comprises a pressure sensor element for monitoring the steam pressure at the steam wand.

It will be appreciated that the apparatus disclosed herein can be a coffee machine. More particularly the apparatus disclosed herein can be an espresso coffee machine.

It will be further appreciated that the apparatus disclosed herein can be used as a coffee machine. More particularly the apparatus disclosed herein can be used as an espresso coffee machine.

BRIEF DESCRIPTION OF THE DRAWINGS

A preferred embodiment of the invention will now be described, by way of example only, with reference to the accompanying drawings in which.

PREFERRED EMBODIMENT OF THE INVENTION

It will be appreciated that espresso machines are widely used in making hot beverages.

Shots of espresso are typically brewed by the pressurised flow of hot water through densely-packed finely-ground coffee. This forced diffusion of water through coffee grounds, results in the production of espresso coffee. Quality, flavour and taste of any resultant espresso coffee are influenced by a plurality of factors, which include the texture of the ground coffee, the density of the ground coffee packing, and temperature and pressure of the water used. By maintaining these factors in appropriate proportions, it is possible to produce substantially consistent shots of espresso.

Figure 1:
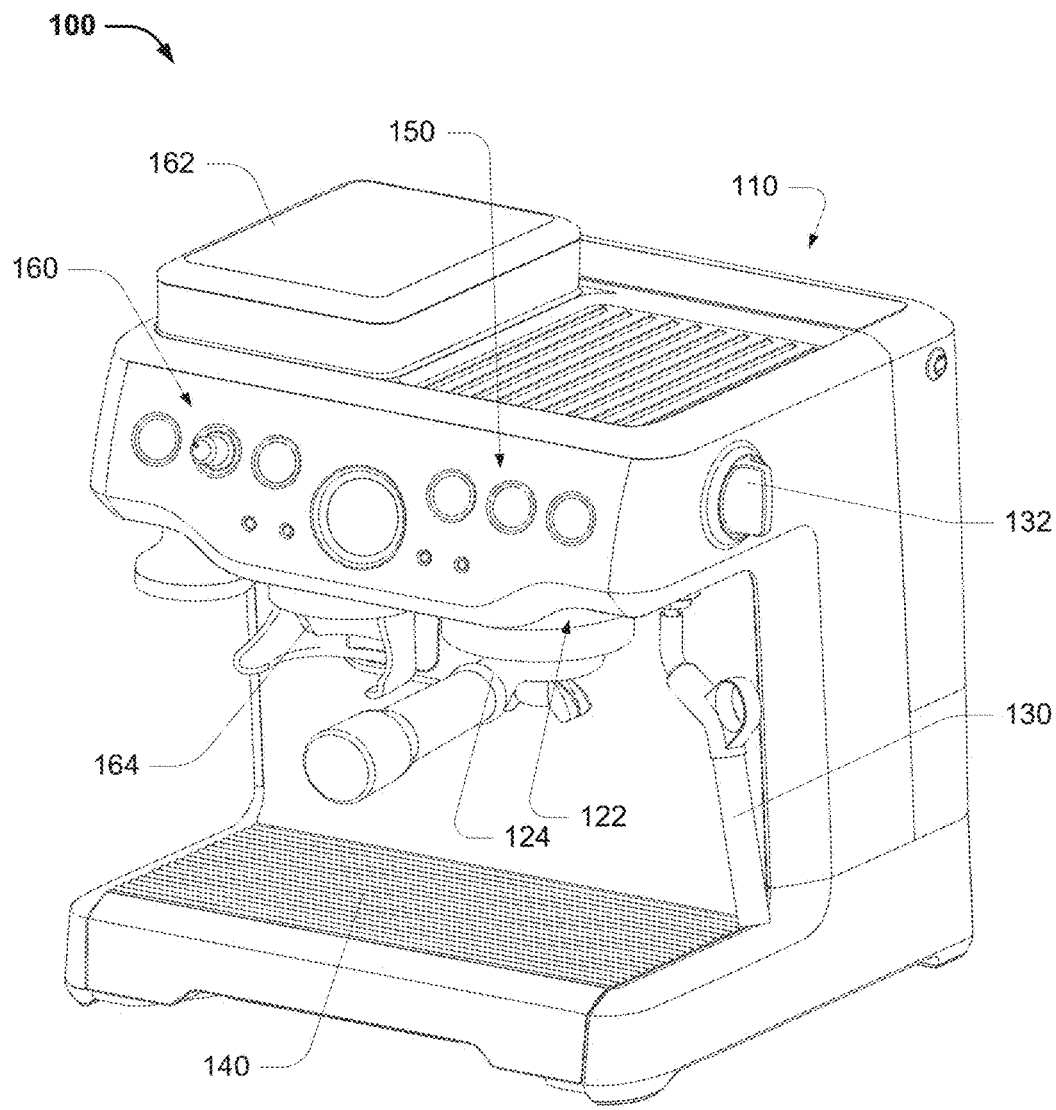
FIG. 1 is a perspective view of an espresso machine.

Pump based espresso machines rely, at least in part, upon the pressure (usually measured in bars) of the pump to make a suitable espresso coffee. Referring to FIG. 1, these pump based coffee machines 100 can include: a water reservoir 110 (typically internal), showerhead or distributor 122, and filter basket 124 (for holding the coffee grounds). A steam wand 130 and steam valve 132 may be included for frothing milk. A drip tray 140 is typically provided for collecting spillages and excess water. A series of user control inputs 150 can be provided for setting at least some of the parameters (or factors) associated with producing espresso coffee.

It will be appreciated that some espresso machines have an integrated coffee grinder 160. This can include a hopper 162 for feeding coffee beans to a grinder and an output 164 for filling the filter basket (when provided there below) with coffee grounds.

With water in the water reservoir, and the coffee grounds in the filter basket, water is heated and pumped to the showerhead 122. Upon heated water reaching the showerhead 122, a forced diffusion of water through coffee grounds in the filter basket occurs, resulting in the production of espresso coffee.

Figure 2:
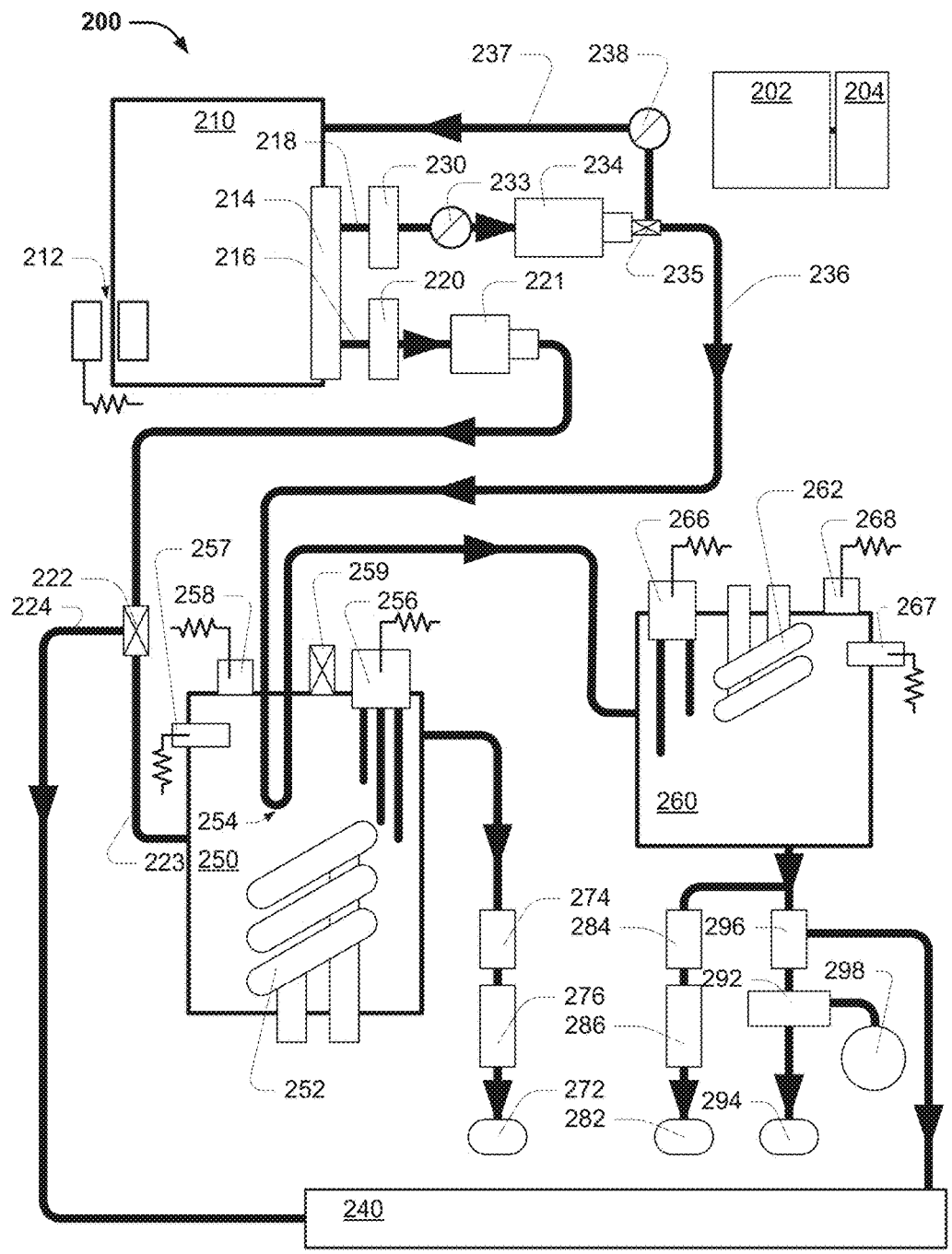
FIG. 2 is a schematic view of an espresso machine.

FIG. 2 shows an schematic for an espresso coffee machine 200. This coffee machine comprises a water reservoir 210, having a reed switch tank level sensor 212. Egress from the water reservoir includes passing though a filter 214 that is in fluid communications with two egress flow paths 216 and 218.

In this embodiment, a first egress path 216 is for communicating or delivering water from the reservoir 210 to a steam boiler 250. This egress path includes a protection filter 220 that communicates water to a pump 221 that supplies water at a pre-determined pressure. A safety relief valve 222 is included to limit the water pressure provided to the steam boiler 250. In the event of over pressure occurring in this fluid line, the relief valve 222 provides or diverts water to the drip tray 240 using fluid line 224. By way of example, the pump 221 provides water with about three bar pressure to the steam boiler 250 (using fluid line 223). For steam system, the pump is supplied the water at approx. 3 bar to refill the boiler. The safety relief valve 222 is set to activate at a higher pressure, and is used for protection.

By way of example, the steam boiler 250 is used to convert water provided by fluid line 223 to steam. The boiler includes a heating element 252, a water level probe 256, a temperature sensing element (for example a thermistor) 257, a thermal fuse and thermostat 258, and vacuum breather valve 259. In this example, the steam boiler is a 0.80 liter boiler. By way of example only, this boiler 250 can be constructed from any one or more materials in a set comprising diecast-aluminium (preferably teflon-lined), stainless steel or brass. The heating element 252 is preferably an immersed 1000 watt heater element. By way of example only, this heating element can be constructed from any one or more materials in a set comprising stainless steel and Incoloy. It will be appreciated that the heating element can have alternative power ratings that are suitable for creating steam within the boiler. The water level probe 256 preferably uses three probes to monitor water level and is substantially comprised of stainless steel probes. By way of example only, the thermistor 257 has a maximum temperature rating of about 200 degrees Celsius.

By way of example, egress steam 272 from the steam boiler 250 is released from a continuously variable delivery ball valve 274 though a steam wand 274. Preferably, the ball valve has a maximum temperature rating of about 150 degrees Celsius, a nominal working pressure of about two bar and a maximum pressure rating of about eight bar. In this embodiment, a second water egress path 218 communicates water from the water tank 210 to a coffee boiler 260. This egress path includes a protection filter 230, a first flow meter 233 and a pump 234. The pump 234 further includes an over pressure (or safety relief) valve 235. This over pressure valve 235 is adapted to limit the water pressure provided to line 236, typically to between nine bar and ten bar. The over pressure valve 235 is typically set to a pressure set-point, typically about ten bar, such that when water pressure exceeds this set-point a portion of the water is fed back through a return line 237 to the reservoir 210, thereby maintaining a pressure set-point. The amount of water fed back through a return line 237 can be measured by a second flow meter 238. The main egress path 236 proceeds through the steam boiler 250 via a heat exchanger 254 and then to the coffee boiler 260.

By way of example, the coffee boiler 260 includes a heating element 262, a water level probe 266, a thermistor 267 and a thermal fuse and thermostat 268. In this example, the coffee boiler 260 is a 0.30 liter boiler. By way of example only, this boiler 260 can be constructed from any one or more materials in a set comprising diecast-aluminium (preferably teflon-lined), stainless steel, or brass. By way of example only, the heating element 262 is an immersed stainless steel 600 watt heating element. The water level probe 266 preferably uses two probes to monitor water level and is substantially comprised of stainless steel probes. By way of example only, the thermistor 267 has a maximum temperature rating of about 150 degrees Celsius.

By way of example, egress from the coffee boiler is used to provide hot water 282, via a continuously variable output needle valve 284, though a hot water wand 286. In this example, the needle valve 282 preferably has a maximum temperature rating of about 120 degrees Celsius and a working pressure of about fifteen bar.

By way of example, egress from the coffee boiler is also used to provide hot water to a coffee showerhead 292 for providing coffee 294. A solenoid 296 releases hot water to the showerhead 292 for making coffee. The showerhead 294 further has a pressure gauge 298 for displaying the pressure of hot water provided by the coffee boiler. By way of example only, the solenoid 296 has a maximum working pressure of about sixteen bar, and a maximum fluid temperature of about 160 degrees Celsius. By way of example only, the solenoid 296 body can be constructed from any one or more materials in a set comprising stainless steel and brass. Different protective coatings can be applied to the solenoid, including nickel-plating.

It will be appreciated that, by way of example only, the fluid lines are either Teflon tubing or silicon tubing.

It will be appreciated that pumps 221 and 234 can be vibration (displacement) pumps, although alternative pump technologies can be used. Vibration pumps typically produce around fifteen bar to eighteen bar unregulated pressure, which is typically considered too high for espresso extraction. To regulate the pressure, a fixed or variable over pressure valve can be installed. However, with such a valve installed, a known method of measuring the dose includes having a flow meter located proximal to the showerhead. It will be appreciated that any installation in the flow proximal to the showerhead requires that the over pressure valve be suited to operation in a high temperature and a high pressure environment. The construction and operation of over pressure valves will be discussed in more detail below.

In an embodiment, the apparatus 200 includes a processor 202 for receiving inputs from user interface 204 and water level probes, thermistors, and thermal fuse/thermostats. The processor is also used to control/activate heating elements and pumps.

In an embodiment, a pair of flow meters are used, the first flow meter 230 to measure the feed flow to the pump and the second flow meter 237 to measure return flow from an over pressure valve 235. In this arrangement, the resultant flow delivered to the coffee boiler 260 (and therefore to the showerhead 296) can be calculated by subtracting the return flow from the feed flow. By calculating resultant flow over a time period of coffee production, a dose measure can be determined. It will be appreciated that this calculation can be performed in real time, and used to stop the pump when a suitable dose has been delivered through the showerhead.

In one embodiment, a flow measurement apparatus, for measuring a resultant flow delivered by a pump coupled to an over pressure valve has a first flow meter for measuring feed flow to the pump, and a second flow meter for measuring return flow from the over pressure. A resultant flow delivered by a pump can be determined by subtracting measured return flow from measured feed flow.

Figure 3:
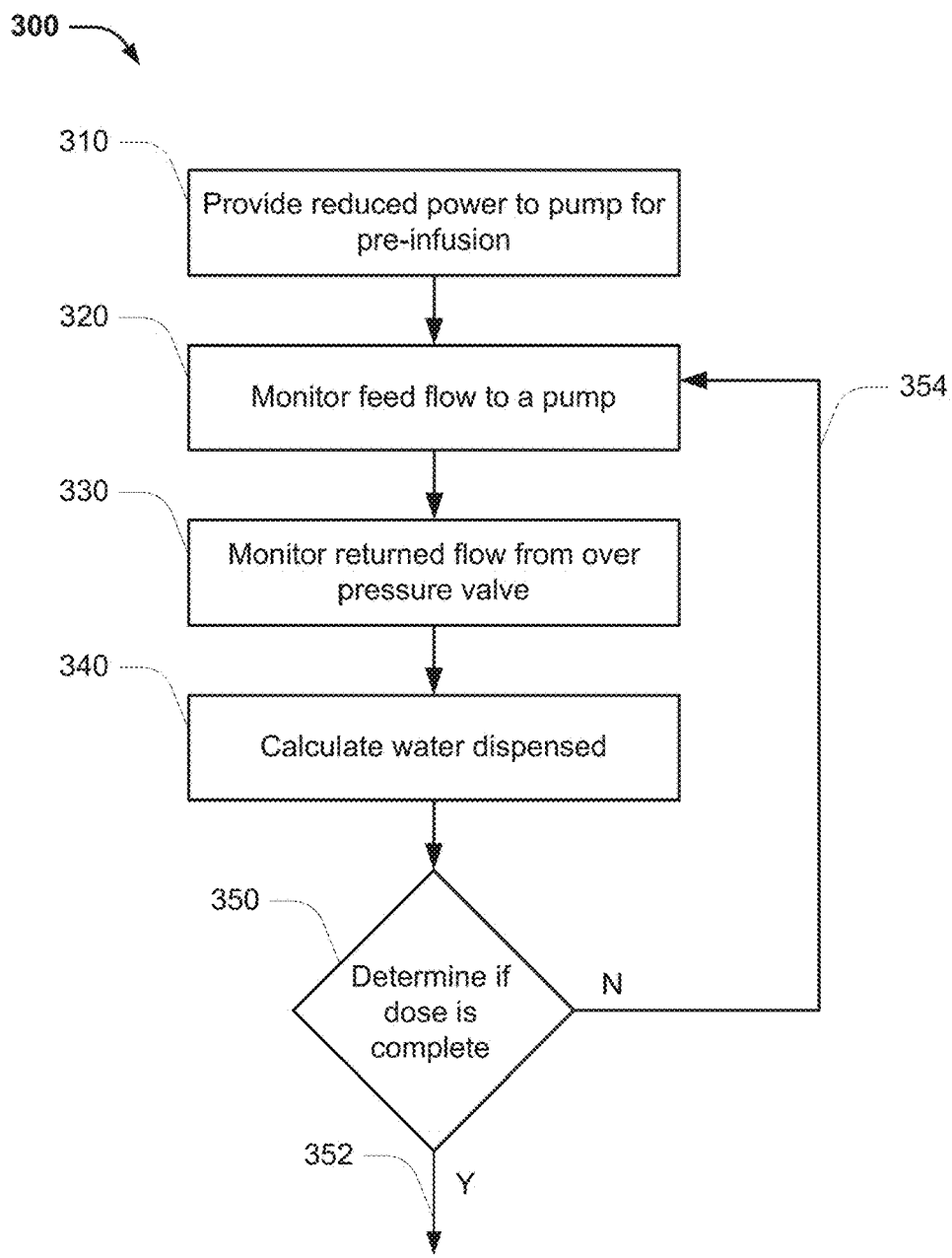
FIG. 3 is a flow chart of a method of controlling an espresso machine.

Referring to FIG. 3, a method 300 of flow measurement for measuring a resultant flow delivered by a pump coupled to an over pressure valve, the method comprising the steps of monitoring (or measuring), using a first flow meter, feed flow to the pump 320; monitoring (or measuring), using a second flow meter, return flow from the over pressure valve 330; and calculating resultant flow, at least in part, by subtracting measured return flow from measured feed flow 340.

It will be appreciated that this calculation can be performed in real time, and used to stop the pump (350) when a suitable dose has been delivered through the showerhead. The pressure, dose amount, duration can be preset or user configurable (using user interface 204 and the machine's controller).

A pre-infusion stage is often initiated to wet the coffee grinds to allow expansion within a filter basket, thereby assisting in trapping fine grinds and restricting water tracking though the filter. To enable wetting without forcing water though the coffee grinds, the water delivered in this pre-infusion stage is usually provided at a pressure of about three bar. However, it will be appreciated that pre-infusion pressure can range from 1 to 5 bar.

In this embodiment, the pump 230 can be controlled to provide a lower (or reduced) pressure pre-infusion stage. This can be achieved by reducing the electrical power supplied to the pump during this stage. Typically, a power modification module, as discussed in more detail below, can be utilised to enable processor control of electrical power supplied to the pump. Preferably, during the pre-infusion stage, the electrical power supplied to the pump enables the pump to produce a lower than normal pressure. The water flowing during the pre-infusion stage may (or may not) be counted toward a subsequent dose has been delivered through the showerhead.

Power control and flow measurement can be combined to enable measurement of a resultant pre-infusion dose. In an embodiment, the pressure, dose amount, duration can be preset or user configurable (using user interface 204).

In an alternative embodiment, where the system pressure is not measured and the pressure may not be configurable to a unit value, a percentage of the maximum pump pressure available can be configured. For example, a pressure profile could comprise 30% of the maximum pressure for 5 seconds, then 100% pressure for 20 seconds, then 70% pressure for a final 5 secs. Similarly, in another example embodiment, the system may exercise a method of volume output configured such that the delivery would entail a 5 ml at 30%, a 20 ml at 100%, and a 5 ml at 70% distribution.

It will be appreciated that a power modification module can further enable pressure profiling during an espresso production cycle. A pressure profile can be preset or user configurable (using user interface 204 and the machine's controller). Pressure profiling can take the form of power-time profile indicative of electrical power delivered to a respective pump.

It will be appreciated that the illustrated apparatus discloses an espresso machine that can provide a dose having a regulated pressure and volume.

It will be appreciated that the illustrated apparatus further discloses an espresso machine that can provide a controlled low pressure pre-infusion.

Over Pressure Valve

An over pressure valve (OPV), also known as an expansion valve, can be used to regulate water flow pressure within an espresso machine. The regulated pressure can be fixed or adjusted. For an espresso machine, an over pressure valve can regulate pressure down, to between nine bar to ten bar on many vibration pump based machines.

Figure 4:
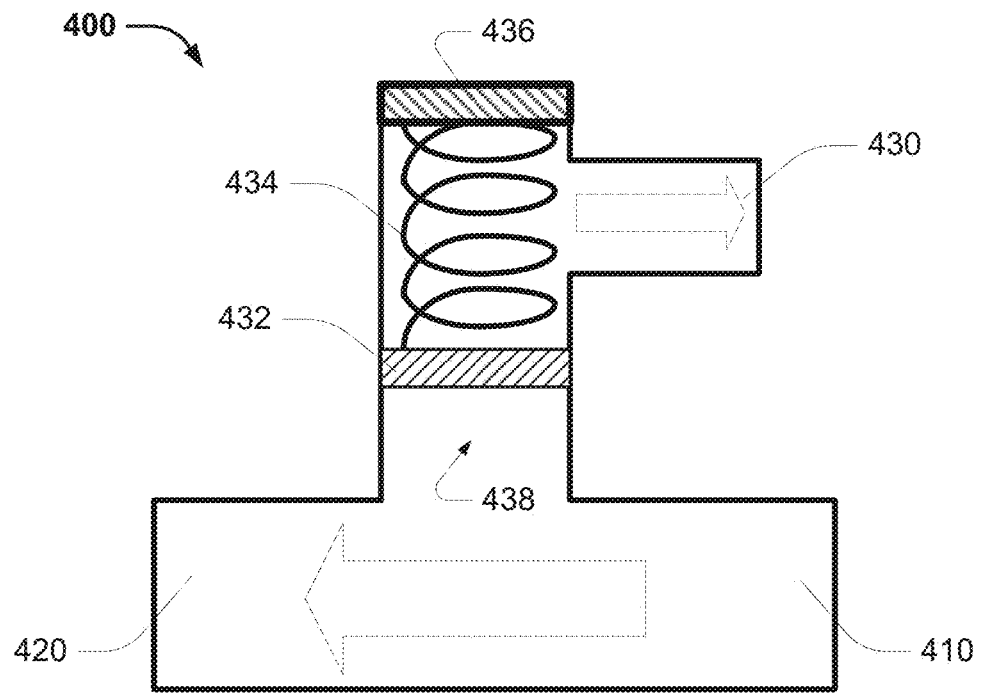
FIG. 4 is a schematic view of an over pressure valve of FIG. 2.

Referring to FIG. 4, an over pressure valve 400 comprises an ingress part or aperture 410 and an egress part or aperture 420. An over pressure part or aperture 430 is included for releasing water to substantially maintain a pressure set-point. A release seal 432, typically in the form of a ball, rubber pad on brass piston or similar, is biased to a closed position by a spring 434 (the tension or compression on the spring can be adjusted 436) against an exit aperture 438. When pressure exceeds in the set-point, the release seal 432 opens allowing water to flow toward the over pressure aperture 430.

The exit aperture is in fluid communication with the over pressure aperture, typically for routing excess water back to the tank.

It will be appreciated that alternative over pressure valves are adapted to be fixed to a 'T' piece, wherein the 'T' piece defines an ingress aperture and an egress aperture. Flow rate capability is typically determined by the size of the over pressure valve.

Power Modification

Figure 6A:
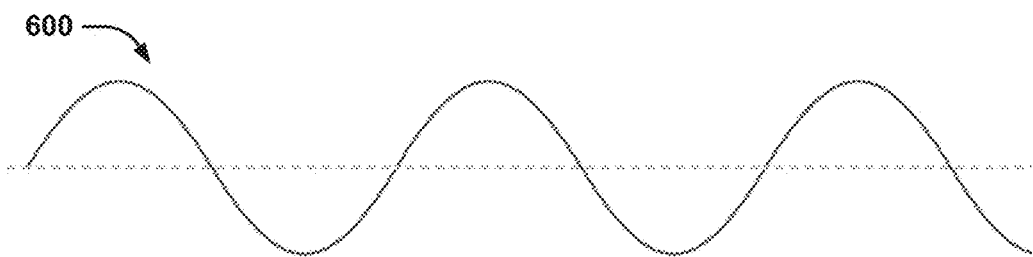
FIG. 6A is a waveform plot power supply signal.

Phase controlled power modification is a method of providing alternating current power to a load only during periods of an alternating current power cycle. FIG. 6A shows a sine wave 600 indicative of alternating current power (voltage or current). Each time the line equals the neutral or ground line, a 'Zero Crossing' occurs.

Circuit diagrams power modification is provided by Motorola data sheet for MOC30xx variants. It has applicability to inductive and resistive loads.

Figure 5A:
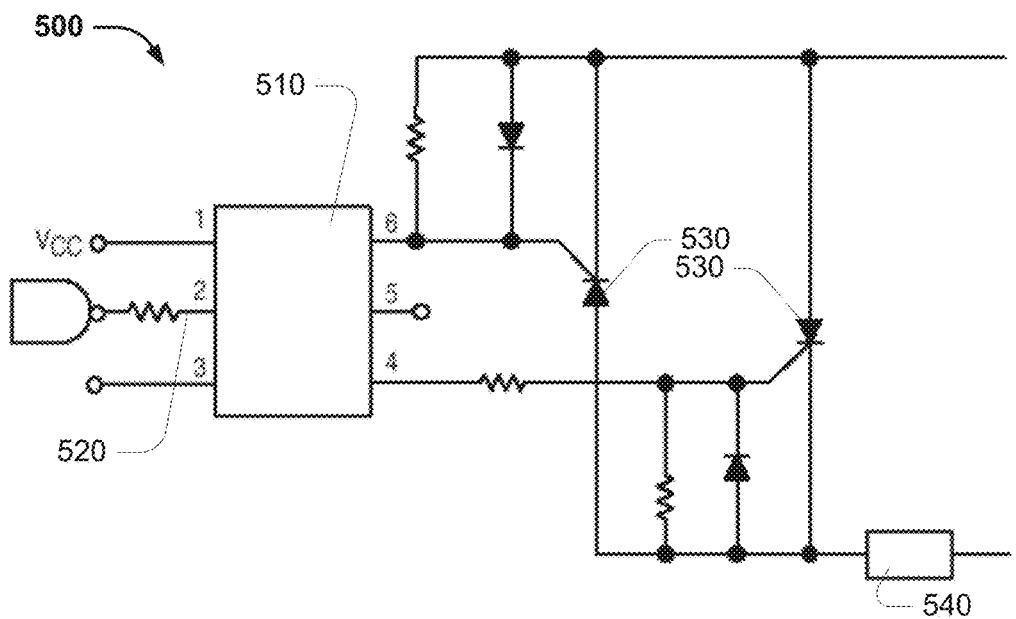
FIG. 5A is a schematic view of a circuit used to modify power supplied to a pump, shown using a silicon controlled rectifier (SCR)

FIG. 5A shows a schematic view of a circuit 500 used to modify power supplied to a pump, shown using silicon controlled rectifier (SCR) 530;

It will be appreciated that a silicon controlled rectifier (SCR) is typically considered as a device which is either on or off. Once turned on, it will only turn off when there is no current flowing through it. The gate requires a small current to switch the SCR on. An SCR will only conduct current one way, so if the current changes polarity, it will turn off, because it won't allow any current to flow.

Figure 5B:
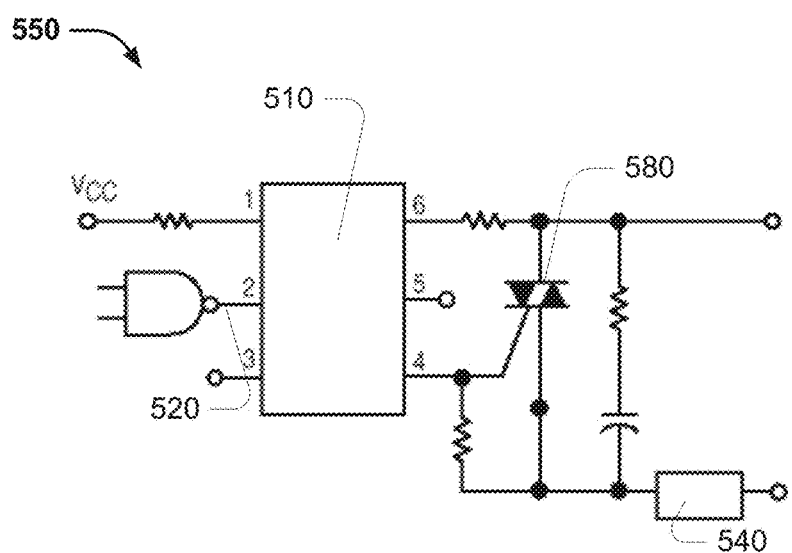
FIG. 5B is a schematic view of a circuit used to modify power supplied to a pump, shown using a triode for alternating current (TRIAC)

FIG. 5B shows a schematic view of a circuit 550 used to modify power supplied to a pump, shown using a triode for alternating current (TRIAC) 580.

It will be appreciated that a TRIAC schematically resembles two SCRs back to back, with only one gate terminal from one of the anodes. This allows AC operation, but every time the current changes polarity the TRIAC turn off (unless the gate is held high).

Phase Control enables only portions of the AC cycle to be coupled to the load 540. This can be performed by a TRIAC, or two back to back SCRs.

It will be appreciated that alternating current sources have two zero crossings every cycle, in which no current should be flowing. In North America the frequency of zero crossings is about 120 times a second, while in Europe the frequency of zero crossings is about 100 times a second.

Figure 6B:
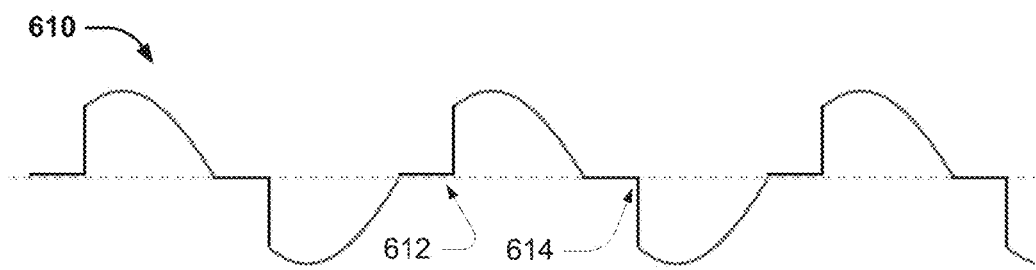
FIG. 6B is a waveform plot of a modification to the power supply signal of FIG. 6A.

As the TRIAC turns off at each zero crossing, if less power is desired to be delivered, the TRIAC can be turned on for a period after a zero crossing, for example at time 612 and time 614, as shown in FIG. 6B.

Figure 6C:
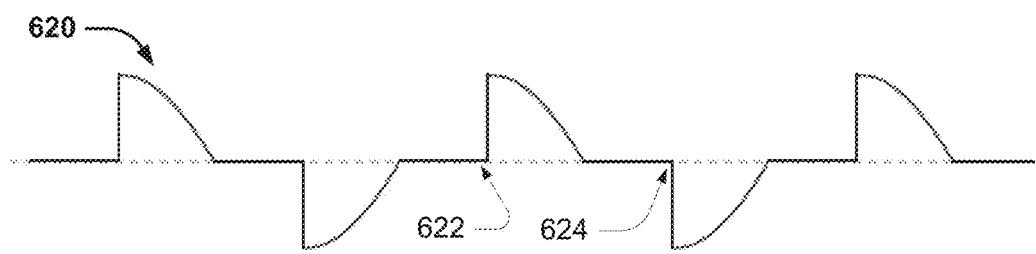
FIG. 6C is a waveform plot of a modification to the power supply signal of FIG. 6A.
Figure 6D:
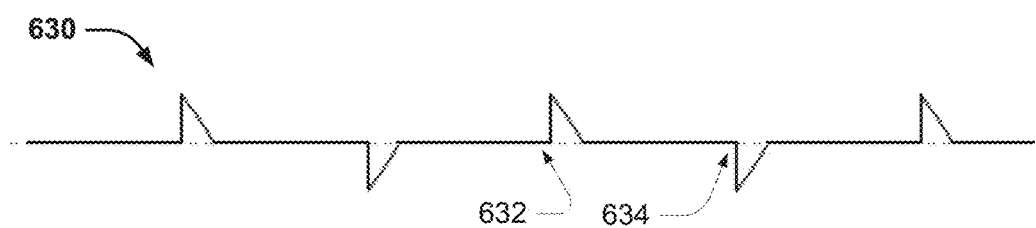
FIG. 6D is a waveform plot of a modification to the power supply signal of FIG. 6A.

Referring to FIG. 6C, if half the power is required, the TRIAC can be enabled at the midpoint between each zero-crossing (time 622 and time 624). Referring to FIG. 6D, by activating the TRIAC just prior to each zero crossing (time 632 and time 634) less than half the power can be provided.

Heated Group Head

It will be appreciated that it is beneficial for an espresso machine (commercial or consumer/domestic) to:

maintain accurate brew temperature consistently over multiple coffee extractions and intra extraction (such as, during a pour);

allow simultaneous coffee extraction and milk steaming without affecting the performance of either process;

ensure that the first coffee extraction that the machine makes, after being switched on, is delivered at the correct extraction temperature; and provide good performance and thermal stability with minimal and efficient power consumption.

A typical domestic electrical output (1700-2400 W) can limit the available power for achieving these beneficial outcomes, particularly when required to supply continuous high volume output (multiple coffees, hot water and steaming milk).

This can be further exacerbated in commercial/domestic espresso machines that typically use lighter weight (lower thermal mass) boiler units. For example stainless steel boilers used in some espresso machines have a relatively low thermal mass. The low thermal mass typically limits the amount of fluid flow that can be achieved while maintaining a constant temperature and/or pressure.

It will be appreciated that combining a steam boiler, a brew boiler, a heat exchanger and heated group head can be beneficial for reducing the power requirements of the heater associated with the brew boiler.

Figure 7:
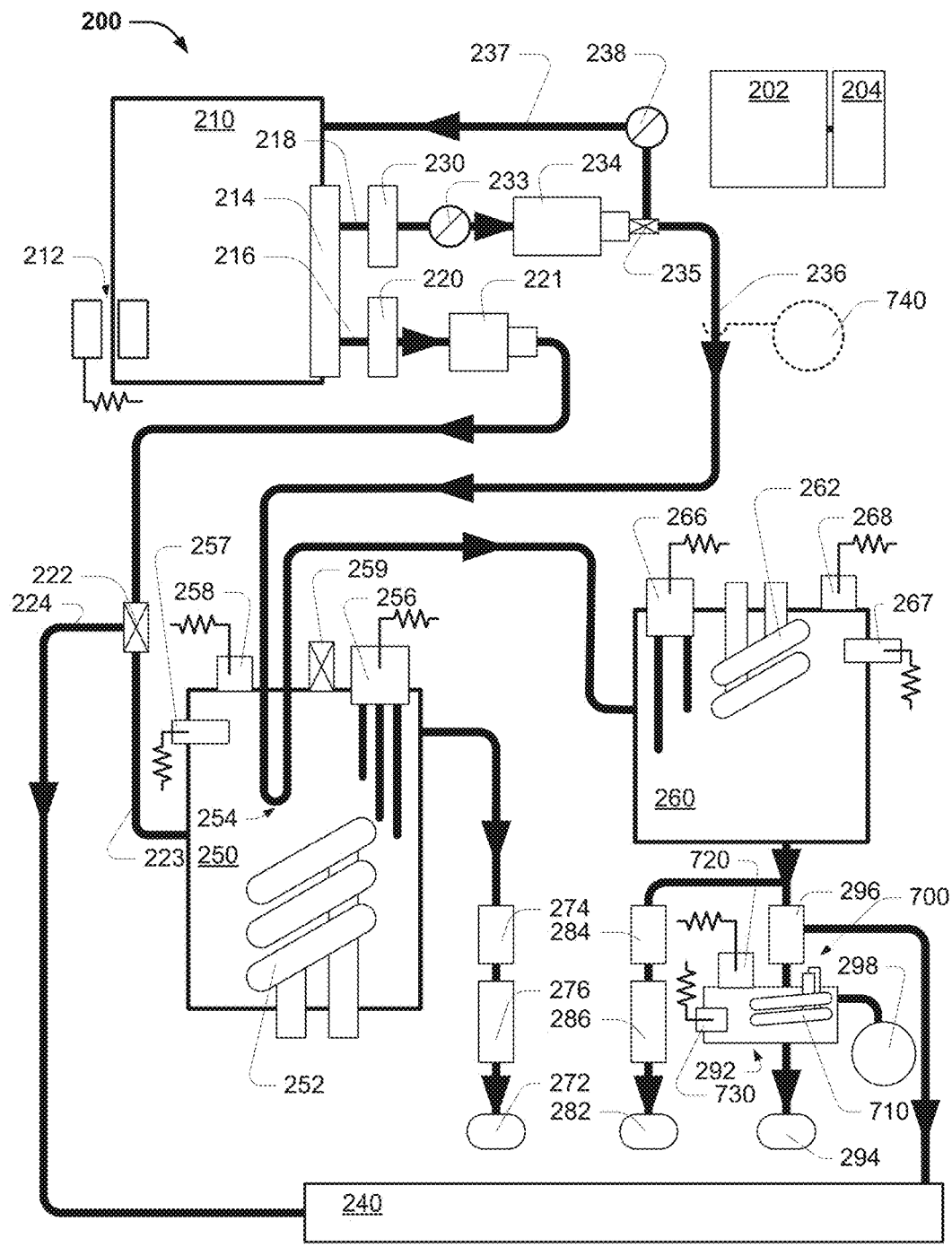
FIG. 7 is a schematic view of an espresso machine, shown having a heated group head.

FIG. 7 shows a schematic view of an embodiment espresso machine similar to FIG. 2, shown having a heated group head 700. This embodiment, enables a 3 stage progressive heating process for brew water, wherein:

A. cold water is pre-heated by heat exchanger 254 in steam boiler 250;
B. pre-heated water from heat exchanger (below optimum brew temperature) is then heated in a brew boiler 260 to an optimum brew temperature (for example to about 92 deg Celsius); and
C. water from brew boiler passes through heated group head 700 (to maintain optimum brew temperature) and is infused into coffee grinds.

The heated group head 700 comprises a heating element 710 (typically embedded), thermal cut-out fuse 720, and thermistor 730.

This enables a heat system for an espresso machine that enables three heating elements to operate independently and simultaneously. The brew boiler and group head are typically temperature controlled using proportional-integral-derivative (PID) control module.

In an embodiment, a boiler capacity ratio of 10:3 (steam boiler:brew boiler) is utilised. A heating element power (wattage) ratio of 10:6:1 (steam boiler:brew boiler:heated group head) can also be utilised.

In one embodiment, boiler capacity to heating element power (wattage) ratio can be established as follows:
steam boiler volume to steam boiler heater wattage being 1000 ml:1000 W or 1 ml:1 W;
brew boiler volume to brew boiler heater wattage being 300 ml:600 W or 1 ml:2 W.

In an alternative embodiment, an optional pressure sensor (or transducer) 740 can be included to monitor water pressure in the flow line 236. This sensor 740 is coupled to an MCU (or processor module) to provide a feedback loop operation for controlling a selected pressure to be maintained in real-time, whereby power supplied to the respective pump is varied according to resultant pressure feedback from the sensor and subsequent instructions from the MCU, controller or processor. In this embodiment, the second flow meter 238 need not be included. It will be appreciated that this adaptation can be applied to other steam control systems (for example the espresso machine 200).

Water Fill Assembly

It will be appreciated that a removable water tank located at the rear of the machine, is typically difficult to obtain regular access for refilling. However, refilling the water tank in situ can result in user error causing overfilling of the tank resulting in potential water ingress issues for the espresso machine body.

Figure 8:
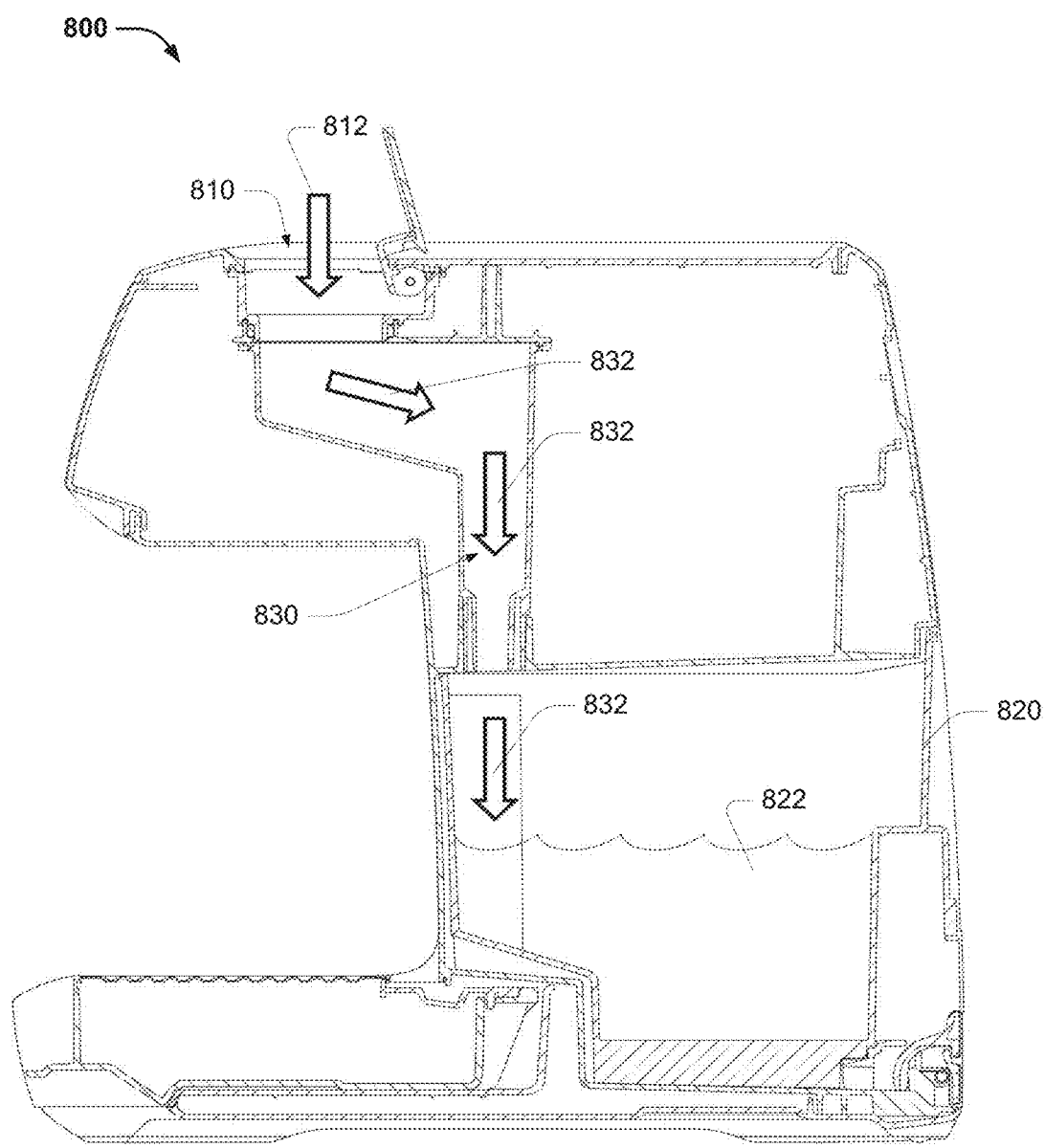
FIG. 8 is a schematic view of an apparatus enabling water fill of an espresso machine according to the invention.

Referring to FIG. 8, an embodiment espresso machine 800 includes a water fill ingress aperture 810 located on the top or the front (or the front portion of the top) of the machine for relative easy access. The aperture 810 may be covered by a hinged door or other lid. The water fill aperture is in fluid flow communication with the water tank 820 (typically via an internal horizontal diverter conduit 830—or funnel). Water 812 can be poured through the aperture 810, which progresses first vertically 810, then horizontally through an enlarged accumulator portion and vertically again 832 to a water reservoir 822 in the water tank 820 located adjacent to the base of the machine.

Figure 9:
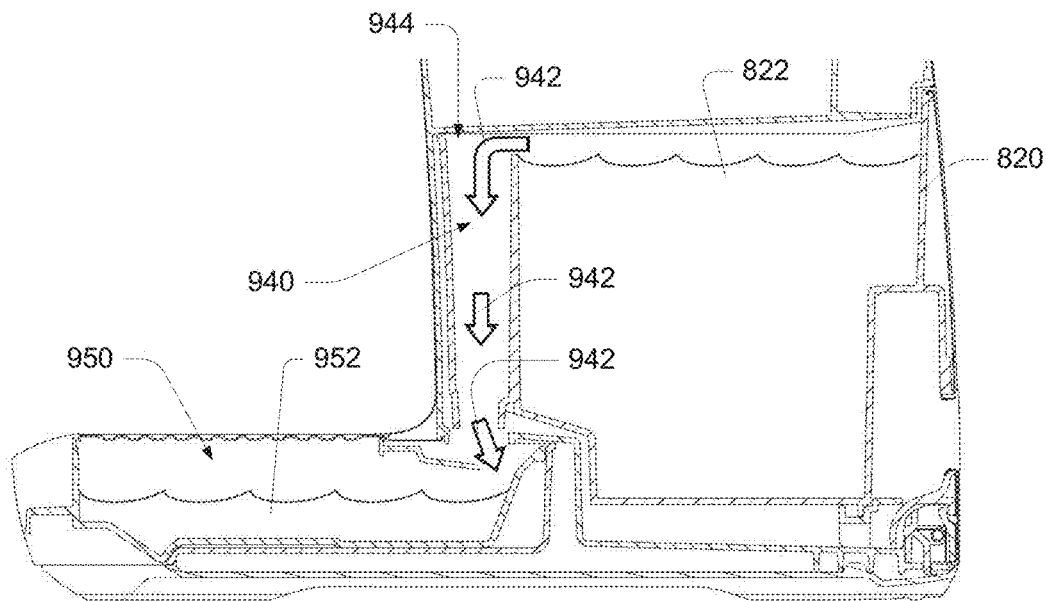
FIG. 9 is a schematic view of an apparatus enabling water fill of an espresso machine according to the invention, showing an overflow path.

Referring to FIG. 9, to avoid overfilling of the tank, and ingress issues to the espresso machine body, a maximum volume diversion channel, cavity or conduit 940 provides a fluid overflow path 942 for enabling excess water to be directed vertically into the rear of the drip tray 950 for fluid collection 952. The diversion channel is defined by a partial height wall that is located between the reservoir 822 and a front-most wall of the tank 820.

In the present embodiment, by way of example only, the diversion channel 940 defines an aperture 944 located within the water tank, at a maximum fill height, for receiving overflow water. The diversion channel 940 is at least partially integrally formed with the water tank and directs overflow water, still within the confines of the tank, to the drip-tray 950.

Using a diversion channel in fluid flow (overflow) communication with a drip tray mounted at the front of an espresso machine body, can reduce risk of ingress of water into the espresso machine components during water filling operation, while providing visual (and preferably audible) feedback to the user for establishing completion of the water filling operation. This can enable refilling of the water tank from the top of the espresso machine.

In an embodiment, an espresso machine comprises:
a removable water tank;
a water refill aperture located at the front or top of the espresso machine, in fluid communication with the water tank;
a front loading drip tray,
wherein the water tank includes a overflow aperture in fluid communication with an the drip tray.

Water Tank Lock Assembly

An unsecured water tank can move due to vibration caused by operation of the machine causing the tank to at least partially disengage from the espresso machine.

The water tank is typically in fluid flow communication with the espresso machine boilers by way of a releasable valve coupling. The release valve restricts fluid flow from the water tank during removal of the tank (typically during filling and/or cleaning).

A partially engaged/disengaged connection between the water tank and boiler (via an inlet valve) can result in leakage, lower brew pressure during operation, or restriction of water flow from the water tank to the boiler.

In an embodiment, a locking assembly can be incorporated to enable secure engagement between the water tank and espresso machine body. The locking assembly can restrict unintentional or undesired disengagement of the water tank from the espresso machine body.

Figure 10:
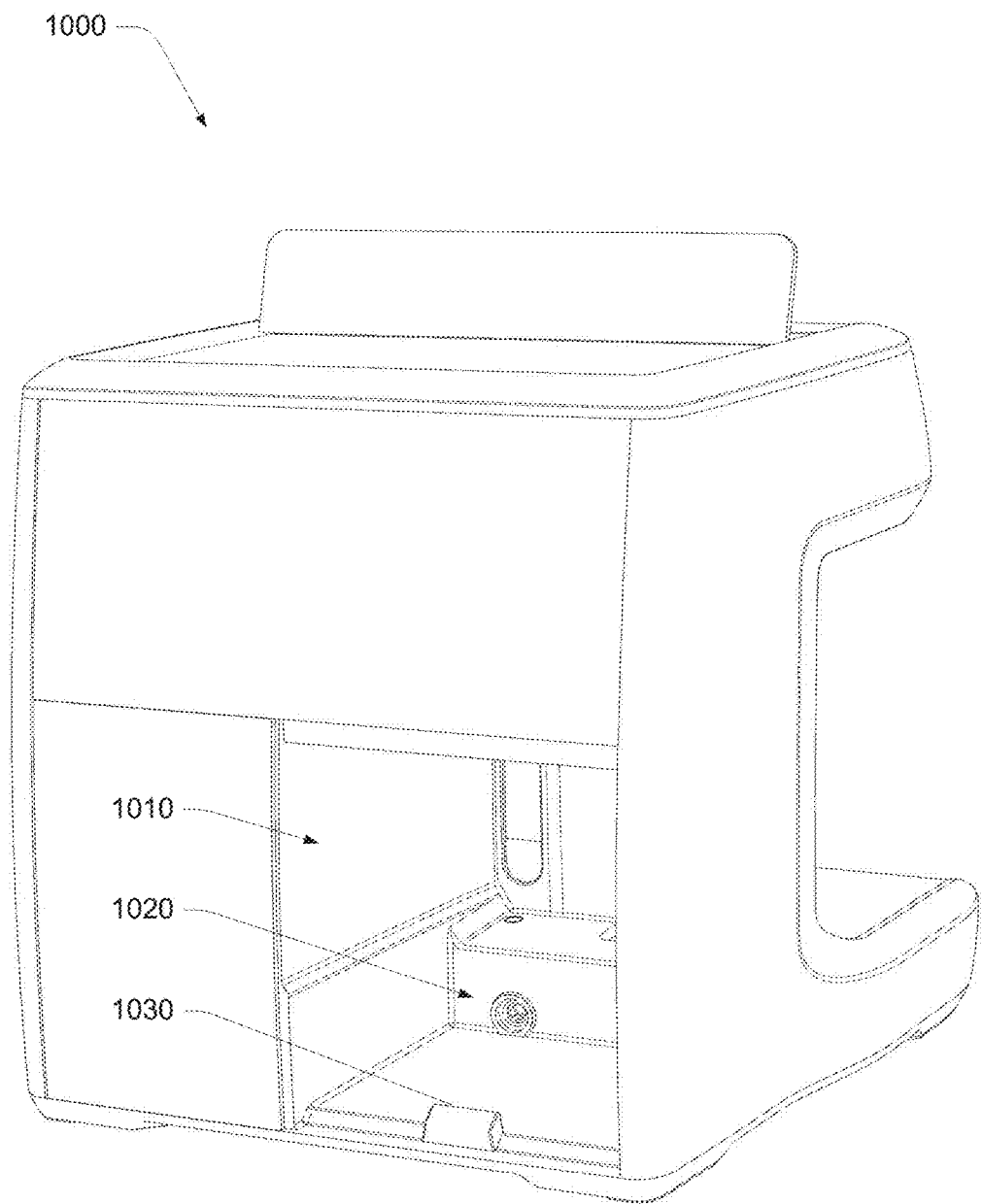
FIG. 10 is a perspective rear view of an espresso machine according to the invention, showing the aperture for receiving a water tank.

FIG. 10 shows a perspective rear view of an embodiment espresso machine 1000, showing an aperture 1010 for receiving a water tank. A releasable valve coupling element 1020 is adapted to receive a release valve (not shown). A lock abutment surface 1030 is adapted for engaging a lock assembly operatively associated with the water tank.

In this embodiment, the water tank assembly is fitted to the espresso machine body in a substantially horizontal direction.

FIG. 11A, FIG. 11B, FIG. 12A and FIG. 12B, show an embodiment water tank assembly 1100 comprising:
a lock assembly 1110 (best shown in FIG. 13A and FIG. 13B) in the form mechanical over centre cam lock for securing the water tank position and ensuring that inlet valve connection is fully engaged; and
a release valve 1120 (best shown in FIG. 14A and FIG. 14B) in the form of a spring biased plunger valve for connecting in a horizontal direction to the water inlet valve coupling element.

Figure 11A:
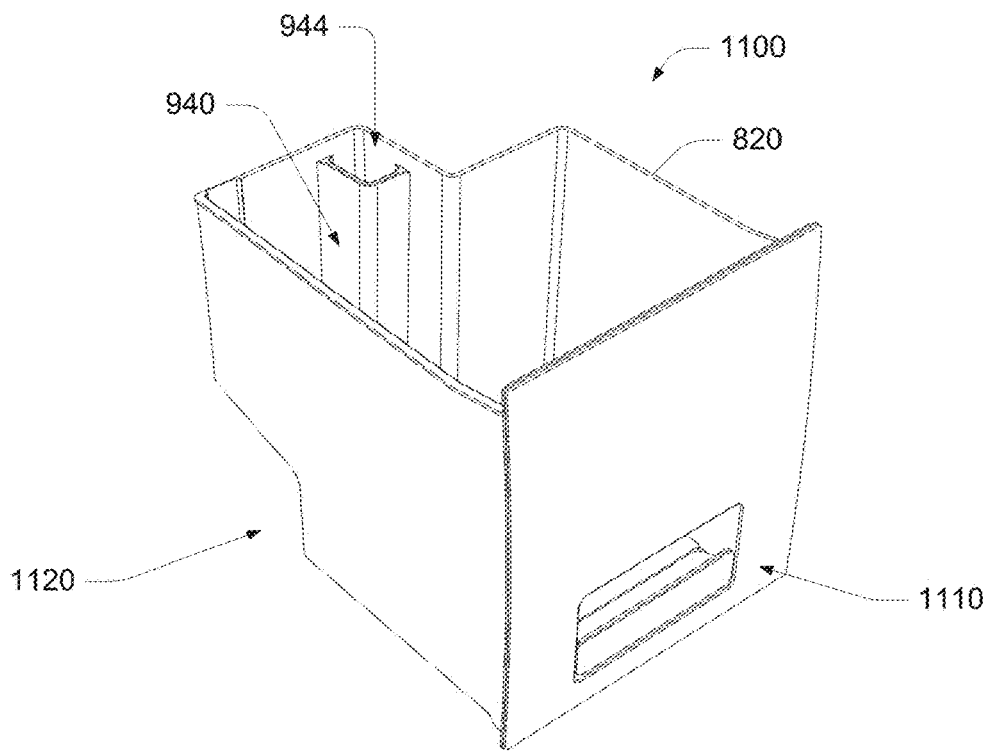
FIG. 11A is a perspective rear view of a water tank.
Figure 11B:
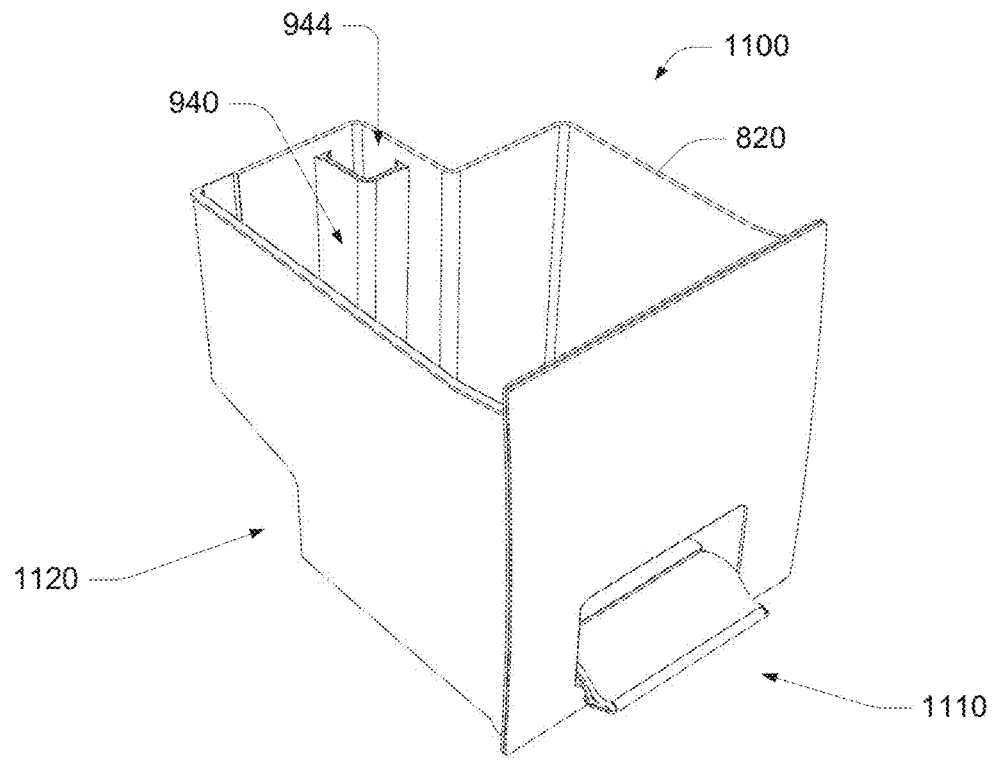
FIG. 11B is a perspective rear view of a water tank of FIG. 11A, shown in the unlocked configuration.

FIG. 11A shows the water tank 1100 having the lock assembly in a locked configuration, and FIG. 11B shows the water tank 1100 having the lock assembly in an unlocked configuration.

Figure 12A:
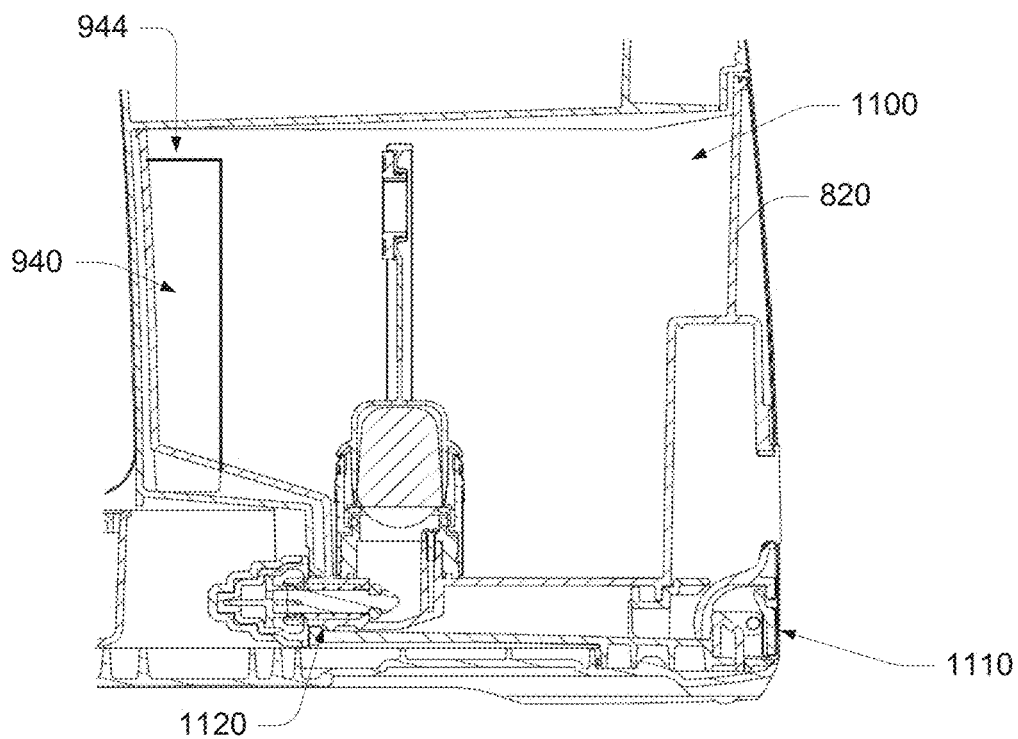
FIG. 12A is a partial sectional side view of the espresso machine of FIG. 8, shown with the water tank engaged.

FIG. 12A shows a partial sectional side view of an espresso machine, shown with the water tank in the engaged configuration. In this configuration, the lock assembly 1110 is in the locked configuration, and the release valve 1120 is in the open engaged configuration for enabling fluid flow from the tank.

Figure 12B:
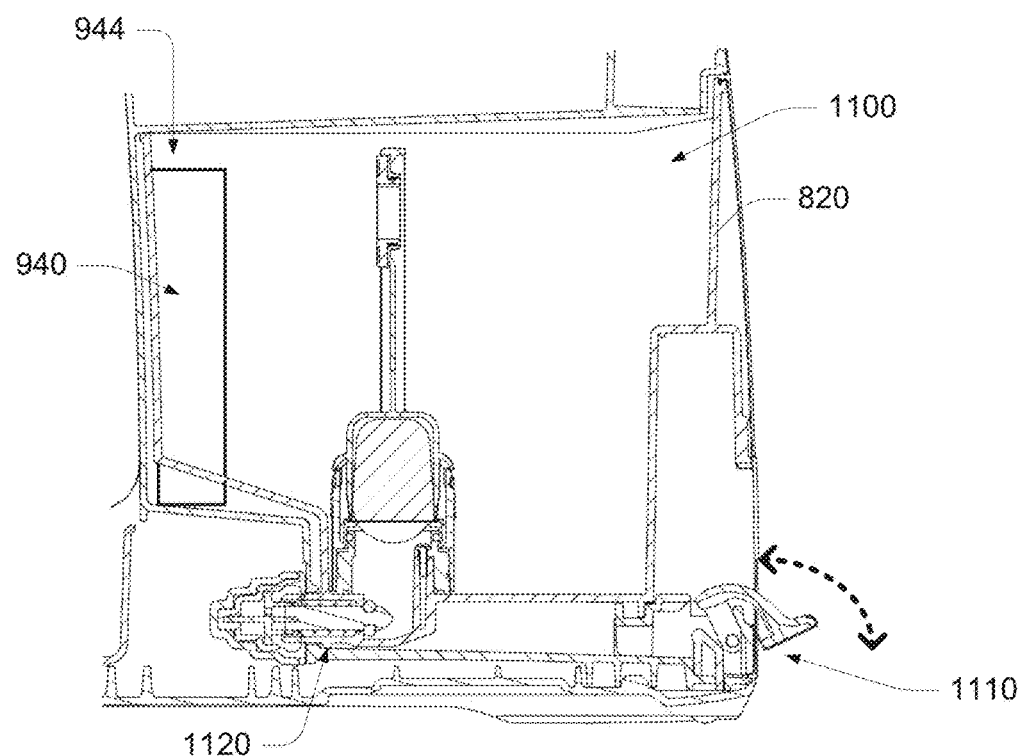
FIG. 12B is a partial sectional side view of the espresso machine of FIG. 8, showing the water tank in an unlocked configuration.
Figure 13A:
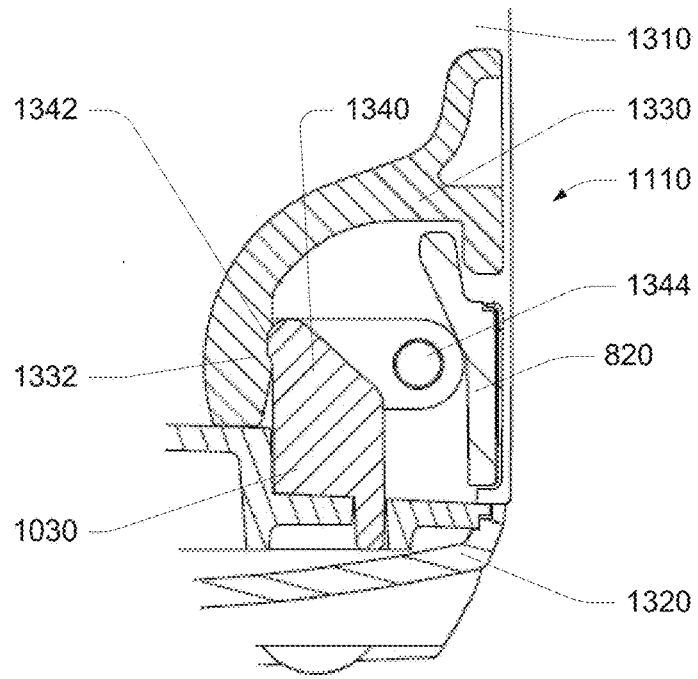
FIG. 13A is a partial sectional side view of espresso machine of FIG. 8, showing a lock assembly in an locked engaged configuration.
Figure 13B:
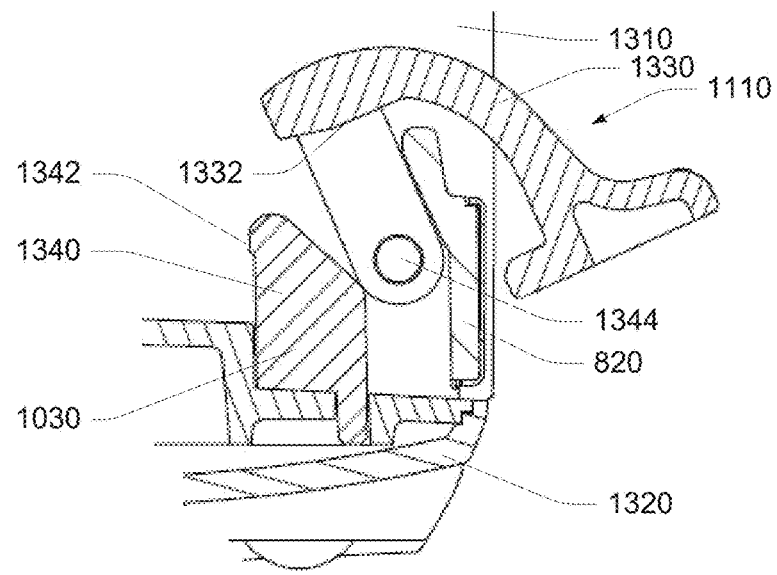
FIG. 13B is a partial sectional side view of espresso machine of FIG. 8, showing a lock assembly in a unlocked disengaged configuration.

FIG. 12B shows a partial sectional side view of an espresso machine, shown with the water tank in the disengaged configuration. In this configuration, the lock assembly 1110 is in the unlocked configuration, and the release valve 1120 is in the closed sealed configuration for restricting fluid flow from the tank, best shown in FIG. 14B Referring to FIG. 13A and FIG. 13B, engaging of the water tank 1310 with the espresso machine body 1320, brings the a lock assembly 1330 proximal to a lock abutment surface 1340. Upon engagement of the water tank, the lock assembly handle can be rotated to a locked configuration (as best shown in FIG. 13 A), wherein a camming lobe 1332 engages a camming abutment surface 1342 for defining an over centre locked configuration. During disengagement, referring to FIG. 13B, rotation of the lock assembly (about pin 1344) disengages the a camming lobe 1332 from the camming abutment surface 1342 to define an unlocked configuration that enables the water tank to be withdrawn. The over-centre cam configuration can restrict unintentional or undesired disengagement of the water tank from the espresso machine body.

It will be appreciated that the camming engagement draws the tank into the espresso machine body to the engaged configuration, and the over-centre cam configuration (whereby the axis of rotation defined by the pin 1344 is above the abutment surface) restricts unintentional or undesired disengagement of the locking assembly.

Figure 14A:
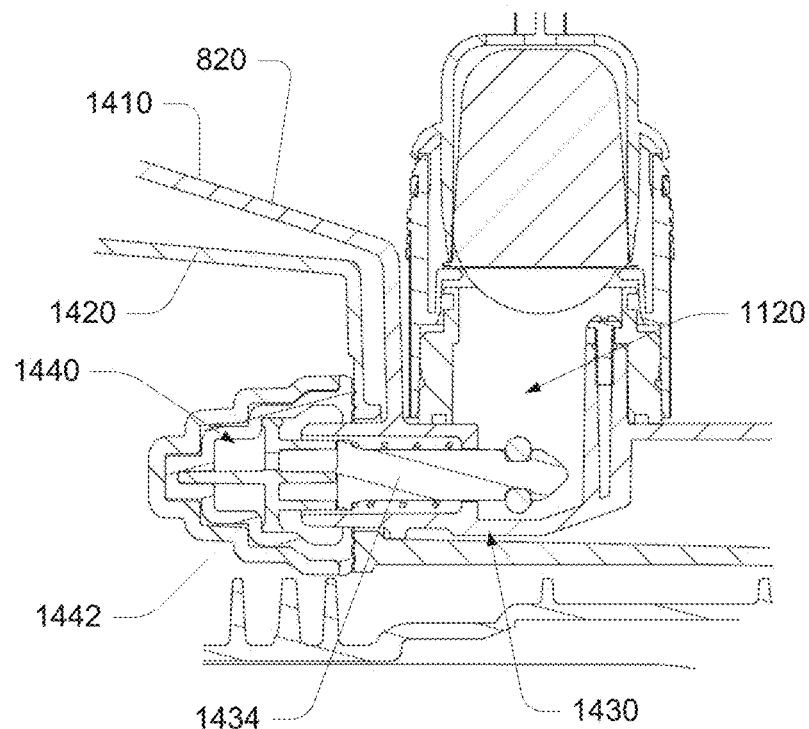
FIG. 14A is a partial sectional side view of espresso machine of FIG. 8, showing a water flow valve in a open engaged configuration.
Figure 14B:
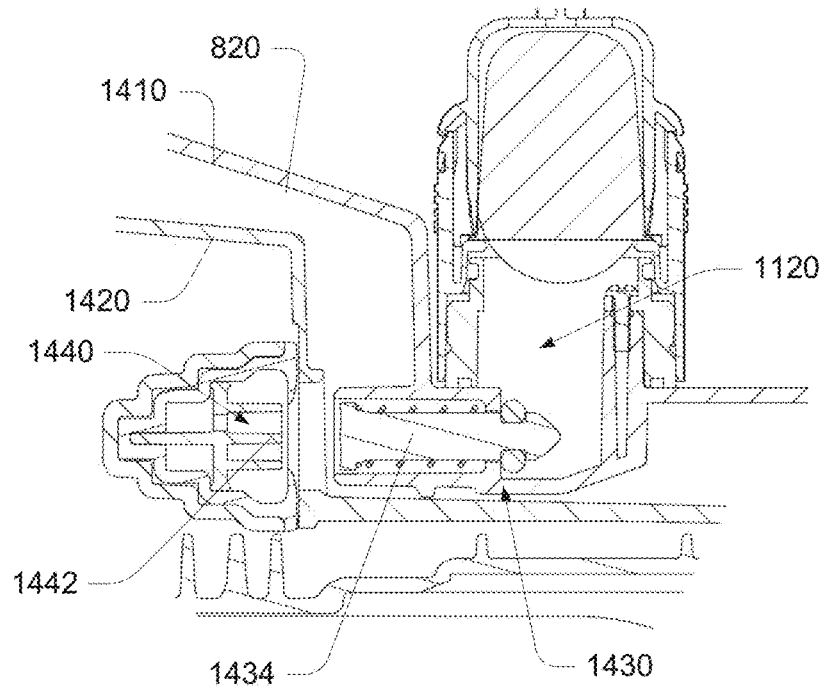
FIG. 14B is a partial sectional side view of espresso machine of FIG. 8, showing a water flow valve in a closed sealed configuration.

Referring to FIG. 14A and FIG. 14B, engaging of the water tank 1410 with the espresso machine body 1420 brings the release valve assembly 1430 into engagement with a releasable valve coupling element 1440. As the release valve assembly 1430 is brought into engagement with valve coupling element 1440, a spring biased release valve 1434 engages an abutment surface 1442 and moving the valve to an open engaged configuration for enabling fluid flow from the tank. During disengagement, referring to FIG. 14B, the release valve assembly 1430 is moved away from the with valve coupling element 1440, causing the spring biased release valve 1434 to disengage the abutment surface 1442 and moving the valve to a closed disengaged configuration for restricting fluid flow from the tank.

Steam Control

Figure 15:
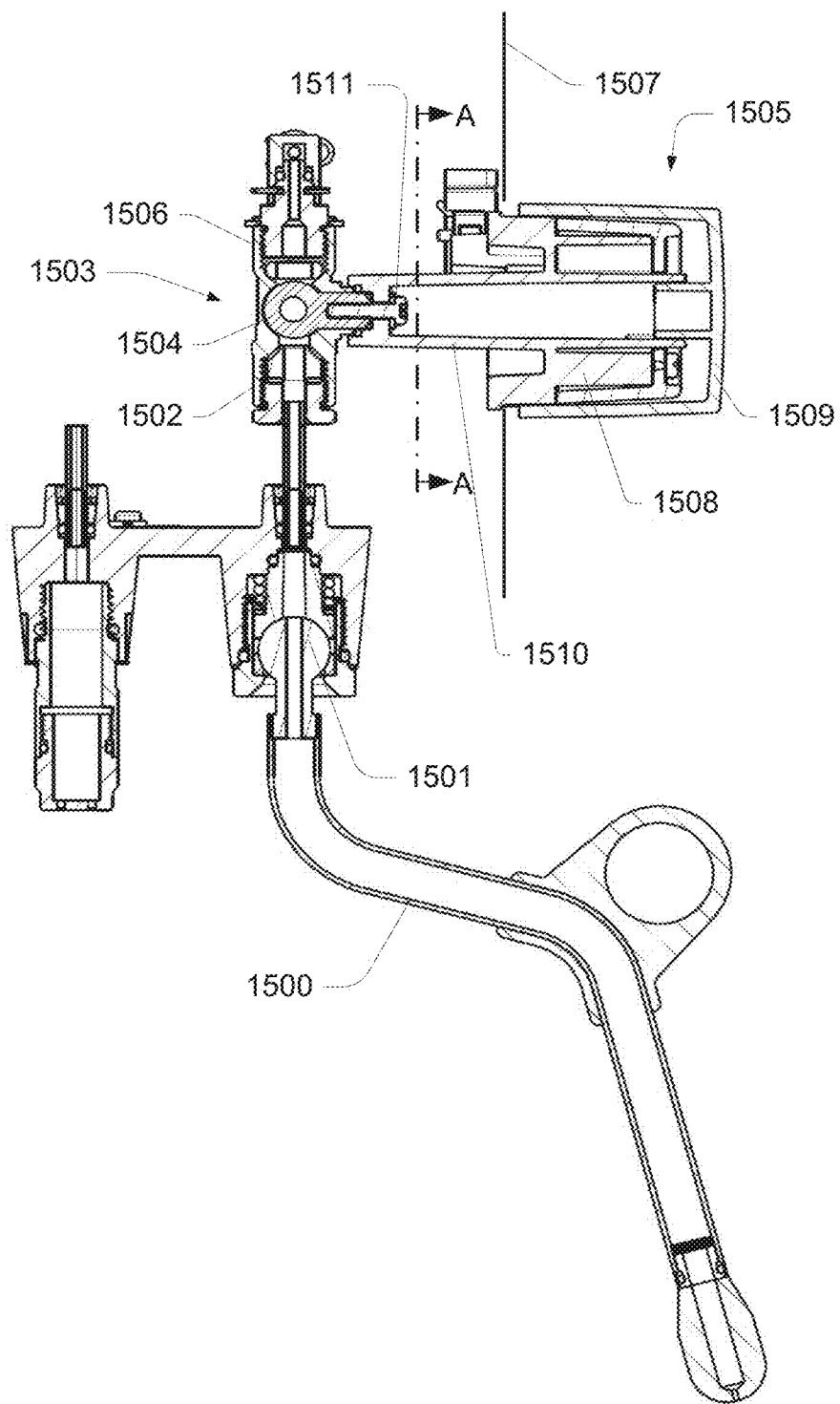
FIG. 15 is a cross section through a steam wand, valve and rotating paddle control.
Figure 16:
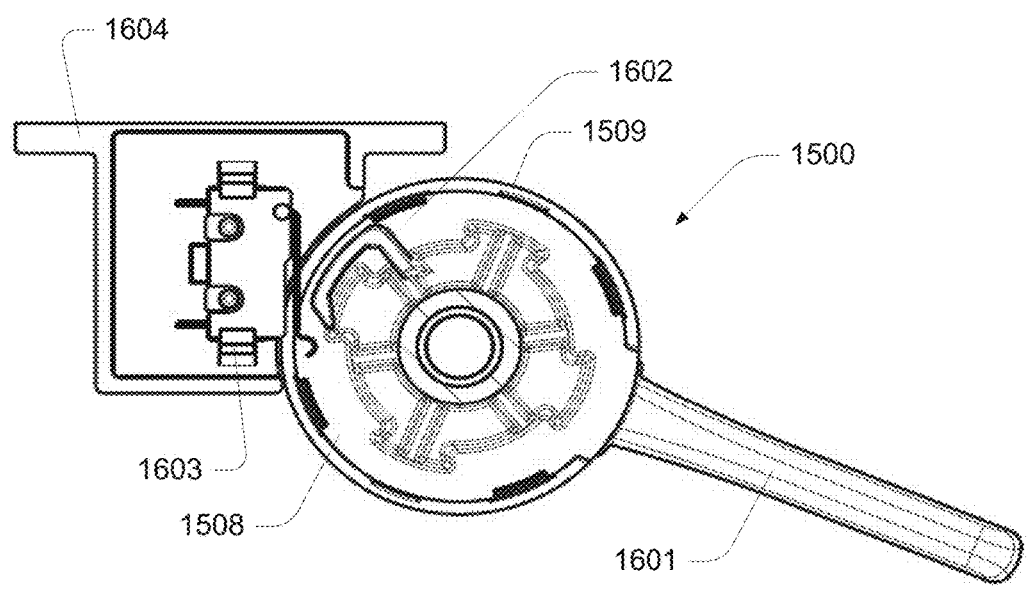
FIG. 16 is a cross section through line A-A of FIG. 15.
Figure 17:
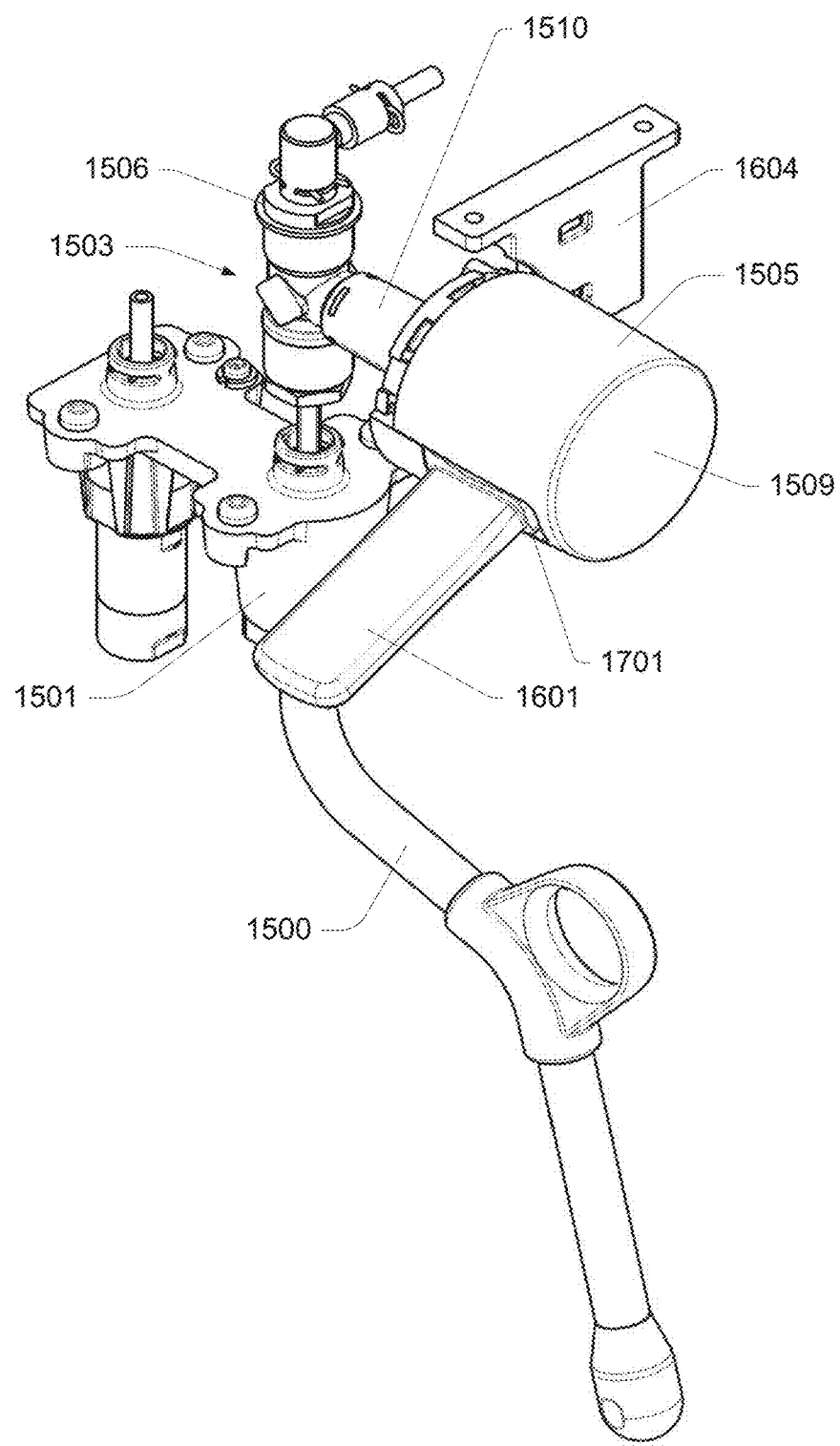
FIG. 17 is a perspective view of the valve, wand and lever depicted in FIG. 15.

FIG. 15 through FIG. 17 show, by way of example only, an embodiment steam control apparatus for an espresso machine.

As shown in FIG. 15, an espresso machine can comprises a steam wand 1500 that pivots about a ball joint 1501. Steam is delivered to the wand 1500 via the output port 1502 of a valve 1503. Rather than utilising a multi-turn needle valve, some embodiments utilise a continuously variable output ball valve 1504 to regulate the amount of steam delivered (continuously from no steam to full steam) to the steam wand 1500. The ball valve 1504 is mechanically operated and mechanically coupled to a rotating paddle 1505 for more authoritative user control. Because the ball valve only needs preferably about 90 degrees of rotation (or at least less than 180 degrees) to go from fully closed to fully open, the user operated paddle 1505 only preferably needs to move through 90 degrees or less to effect full control over the output of the wand 1500. Up to 180 degrees may be acceptable. In this embodiment, the inlet port 1506 receives steam from a steam boiler (for example, a steam boiler 260 as shown in FIG. 2 and FIG. 7). The ball valve 1504 is within the external housing 1507 of the espresso machine.

With reference to FIG. 15, FIG. 16 and FIG. 17, it will be appreciated that the rotating paddle 1505 consists of a lever hub 1508 that carries a radially extending paddle or lever 1601. The lever 1601 provides a convenient grip and a way for the user to apply more torque (accurately) to the valve 1503. The hub carries an external cover 1509 in which is formed a slot 1701 through which extends the lever 1601. The hub 1508 also has a longitudinal extension in the form a hollow shaft 1510 through which is inserted a fastener 1511 that connects the shaft 1510 to the rotating element of the valve 1504, in this example, a ball valve.

As shown in FIG. 15 and FIG. 16, an interior (or interior facing portion) of the hub 1508 is formed as, or carries, a cam surface 1602. The cam surface 1602 cooperates with a micro switch 1603 that may be located within a mounting bracket or housing 1604. The cam surface 1602 is adapted to bear against the micro switch 1603 and thereby activate it when the lever 1601 is rotated into a position that allows the valve to deliver steam through the wand 1500. Thus, the micro switch 1603 can deliver to the espresso machine's MCU, a data (or logging) signal that can be used by the MCU for a variety of purposes. In one example, if the machine is switched on while the micro switch 1603 is activated, the MCU will recognise the output of the micro switch as being indicative that the output of the steam wand is in fluid communication with a steam boiler. This being an undesirable condition, the MCU will either prevent the steam boiler from heating or will block the output to the steam wand until the situation is rectified by the user. In preferred embodiment, both the cam surface 1602 and micro switch 1605 are internal to the housing 1507.

In an embodiment, a steam control apparatus for an espresso machine comprises:
  a ball valve in fluid communication with a steam wand;
  a hub having a radially extending lever element; the hub being rotatable mounted with respect to the espresso machine; the hub and lever element being operative coupled to the ball valve, which can operating in a variable state;
  wherein the apparatus can be configured from a fully closed configuration to a fully open configuration by rotation of the hub of less that 180 degrees.

Typically, the steam control apparatus includes a switch sensor element for providing a data (or lodging) signal to a computing module. The data signal can be indicative for the apparatus being in a fully open configuration wherein output of the steam wand is in fluid communication with a steam boiler.

Figure 18:
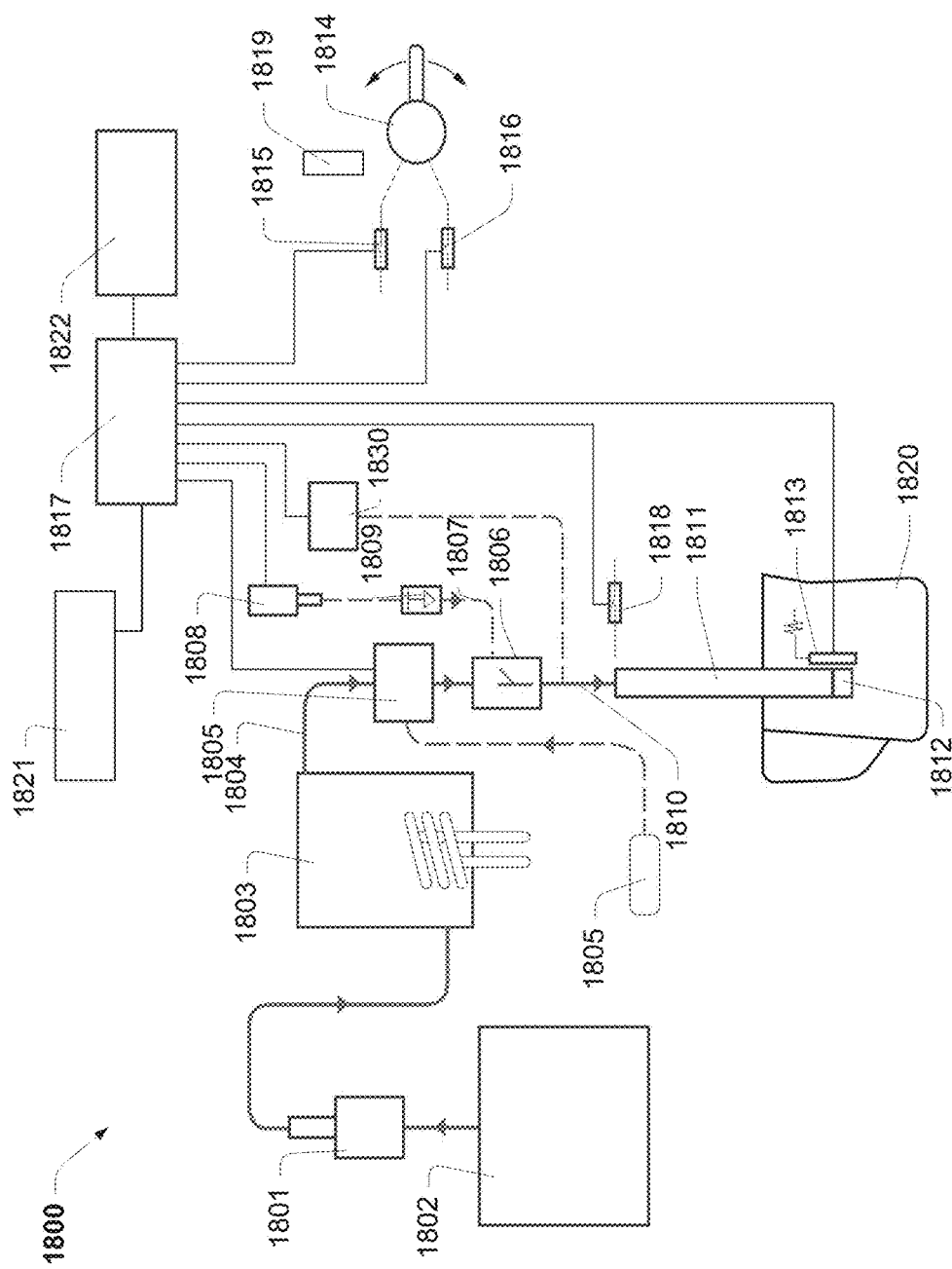
FIG. 18 is a schematic diagram of a further embodiment of the technology.

A further embodiment of the invention is disclosed schematically in FIG. 18. As shown in that diagram, an espresso machine 1800 comprises a pump 1801 that draws water from a water tank 1802 and supplies it to a steam boiler 1803. Steam from the boiler 1804 is supplied to a solenoid activated valve 1805. The three way two position solenoid valve 1805 is used to start and stop the flow of steam from the boiler 1803 to the wand 1811. In preferred embodiments, a large majority of the wand assembly is constructed in plastic so as to isolate the universal heat in the nozzle 1812. The temperature of the nozzle being monitored by the thermistor 1813 and being generally representative at the temperature of the liquid or milk surround the nozzle 1812. When the solenoid 1805 is closed, it allows the steam path to have an open flow path to the atmosphere. Exposing the steam flow path to the atmosphere prevents milk from being siphoned back into the wand 1811 and the venturi 1806. Milk in these areas can cause contamination, foul odours and blockages. The valve 1805 is adapted to supply either unadulterated steam from the boiler 1803, or to allow flow of atmosphere to the venturi. The venturi 1806 is also supplied with air, preferably pressurized air 1807 that is supplied from an air pump 1808. The supply of air from the air pump 1808 passes through a one way valve 1809. A blockage in the steam wand 1811 can cause back pressure in the steam path that can potentially damage the air pump 1808. The check valve 1809 prevents damaging back pressure events from adversely effecting the air pump 1808. The output 1810 of the venturi is supplied to a steam wand 1811. The steam wand 1811 has an output steam nozzle 1812 having attached to or adjacent to it or associated with it a thermistor such as an NTC thermistor 1813. A rotating steam lever 1814 activates switches such as micro switches 1815, 1816. One of the micro switches 1815 modulates the automatic steam generation process. The other micro switch 1816 is used to govern manual steaming operations. The state of the switches 1815, 1816 is monitored by a micro processor control unit (MCU) 1817. The MCU also reads the output of the thermistor 1813 and serves to control the air pump 1808 and solenoid activated valve 1805. The MCU also detects a signal from a third microswitch 1818 that is controlled in accordance with the position of the steam wand 1811. In particular, the micro switch adjacent the steam wand 1818 detects when the steam wand 1811 has returned to an upright or home position and is thus in a position that is compatible with a purging of the steam wand, in particular an automatic purging as will be explained.

For automatic steam operation, a user momentarily activates the lever 1814 so that a first micro switch 1815 is contacted. In preferred embodiments, the steam wand 1814 acts against a spring or other resilient bias 1819 so that the lever returns to its original, neutral position when released. The signal from the micro switch 1815 (or lack of signal) detected by the micro processor 1817 causes the solenoid valve 1805 to open and let steam from the boiler 1804 to flow the venturi 1806. At the venturi, steam from the boiler is mixed with air 1807 from the pump 1808. The steam air mixture travels through the steam wand 1811 and exits the nozzle 1812 directly into a container 1820, preferably containing milk. The temperature sensor 1813 measures the temperature and transmits the relevant signal to the MCU 1817. The MCU then causes the display of the milk temperature 1821. Preferably, the display 1821 is located on a front panel of the espresso machine or stand alone milk frothing device. The milk temperature can be preset by the user using a separate control located in an interface. When the milk in the container 1820 reaches a predetermined temperature both the solenoid 1805 and the air pump 1808 are disabled or deactivated. When the solenoid 1805 is deactivated, the steam passageway to the wand 1811 is open to the atmosphere 1805.

The air pump can act independently such that it can activate and deactivate according to a preset temperature, time and or combined logic.

In a manual steaming operation, the user activates the steam lever 1814 in an opposite direction and against the second micro switch 1816. This causes the solenoid 1805 to open and lets steam flow from the boiler 1804 flow to the venturi. In this mode, steam passes directly through the venturi and air 1805 is not introduced into the steam passageway. Steam travels through the steam wand 1911 and exits the nozzle 1812 directly into the container 1820. The temperature sensor 1813 measures the temperature of the milk in the container 1820 and then appropriate signal is transmitted to the micro processor 1817. The micro processor causes a display 1821 on the body to show the milk temperature. When enough steam has been delivered, the user deactivates the steam lever 1819 back into the home or neutral position. When deactivated in this way, the solenoid 1805 is open to the atmosphere. By opening the steam passageway to atmospheric pressure, the condensation of the hot steam in the steam passageway does not cause milk from the container 1820 to be drawn back into the nozzle 1812.

An alternative semi-automatic operation—a user can select a (factory pre-set or custom) temperature, such that when a user froths milk, a sensor recognises and/or calculates an approach of user selected temperature and indicates to the user via audio and or visually displayed feedback to switch off the steam delivery.

In preferred embodiments, after an automatic steam generating function has been performed and the container 1820 has been removed, the wand position micro switch 1818 will identify when the wand has returned to the "home" or safely down position. The signal from the micro processor 1818 will be detected by the MCU 1817 and will cause the solenoid 1805 to open for short bursts (e.g. 1 second) or a series of short burst for the purpose of clearing the opening in the nozzle 1812. This can be an automatic function to purge the line of frothing debris. In some embodiments, an audible or visual warning may precede this function to alert the user that steam will be ejected from the nozzle 1812. The presence of the wand position sensor switch or micro switch 1818 allows other automated functions to be performed when the steam wand is in a home or fully down position. The flow or rate of delivery of air from the air pump 1808 can be controlled, for example, by pulse width modulation. This rate of air flow can be controlled by the user through the user interface 1822. The control of the output of the air pump 1808 has the effect of determining the texture of the frothed milk produced in the container 1820. A high flow rate will create a more textured or airy foam whereas a low flow rate will result in a denser, less textured foam.

In an embodiment, a pressure sensor 1830 can be use in enabling the processor MCU 1817 to monitor the steam pressure at the steam wand 1811. In this embodiment, the pressure sensor is coupled to steam path between the venturi 1806 and steam wand 1811. It would be appreciated that this enables: detection of the steam wand being partially or fully blocked (typically due to a build up of residue in steam wand outlets), which would enable the MCU to stop the steam function and/or alert user of problem; and providing live/real-time feedback of combined steam/air pressure for allowing the MCU to control that air pump flow rate to achieve a preset pressure parameter.

Figure 19:
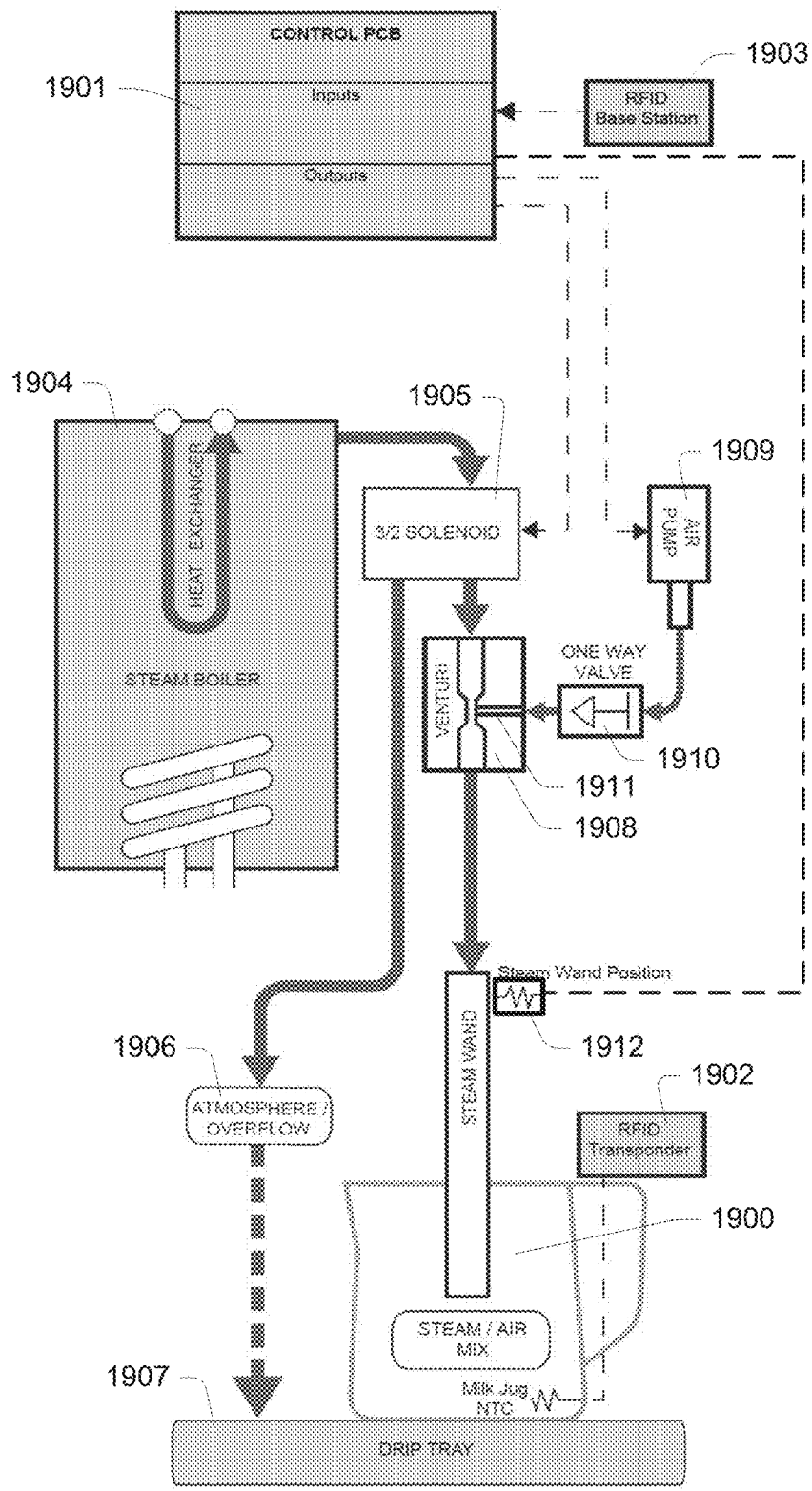
FIG. 19 is a schematic diagram of a further embodiment of the steam wand assembly, using a wireless communication element.

As shown in FIG. 19, the temperature of the liquid being steamed in the jug 1900 can be communicated to the input of the control PCB 1901 wirelessly. In this example, the jug 1900 includes a thermistor such as an NTC thermistor and a transponder 1902 such as an RFID, Wifi, bluetooth or infrared transponder. The transponder 1902 emits a wireless (or other radio frequency) signal that is received by a cooperating receiver chip or base station 1903. The receiver or base station 1903 supplies the appropriate signal to the input of the PCB 1901. As with previously mentioned embodiments, the steaming device depicted in FIG. 19 includes a steam boiler 1904 that supplies steam to a 3/2 solenoid 1905. The solenoid controls the flow of steam into the venturi 1908 while simultaneously allowing for overflow or excess pressure to be discharged to the atmosphere 1906, particularly contemplating discharge into the drip tray 1907 that is located below the jug 1900. As with other embodiments, the venturi receives air or pressurized air from an air pump 1909. A protective one way valve 1910 is interposed between the air pump and the venturi suction inlet 1911.

As illustrated in FIG. 19, the steam wand is associated with a steam wand position sensor 1912. The position sensor 1912 supplies a signal to the control PCB 1901. When engaging in manual steaming operations, the control PCB 1901 will allow steam to be discharged through the solenoid 1905 when the wand is in any position. However, in automated steaming operations (where the user is not directly controlling the steam output with a button on knob) or during automated cleaning of the steam wand, the PCB 1901 will only allow the solenoid 1905 to operate when the steam wand is in a specified (the "down") position, as determined by the position sensor 1912.

Figure 20:
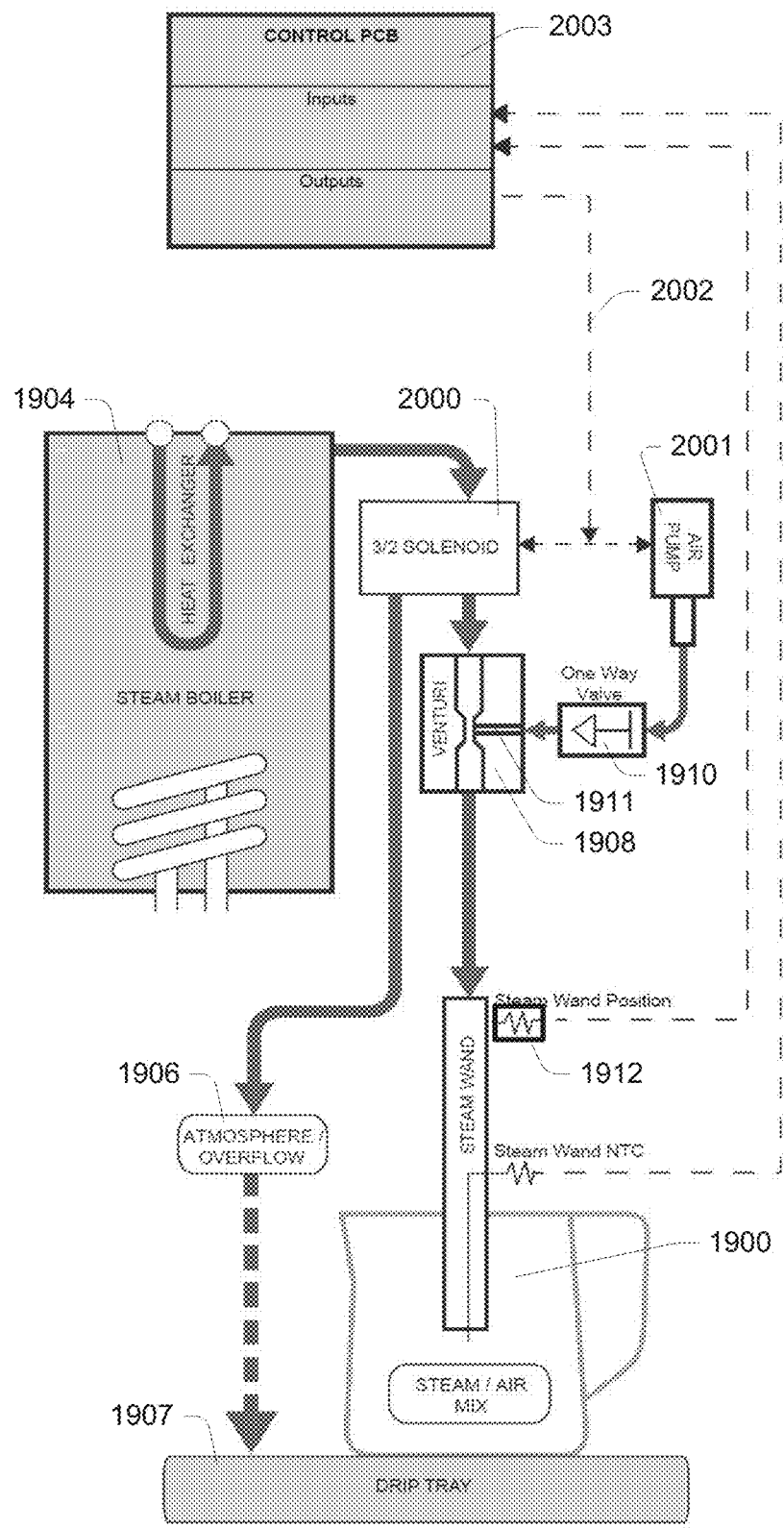
FIG. 20 is a schematic diagram of a further embodiment of the steam wand assembly, using a dependant air stream.

As shown in FIG. 20, some embodiments of the invention require the primary steam solenoid 2000 to be controlled jointly or simultaneously or otherwise in a slave relationship with the air pump 2001. The onset of the operation of the air pump can be delayed relative to the onset of the steam flow. To accomplish this, a single output 2002 from the control PCB 2003 is used to control the on and off operation of both the solenoid 2000 and the air pump 2001.

Figure 21:
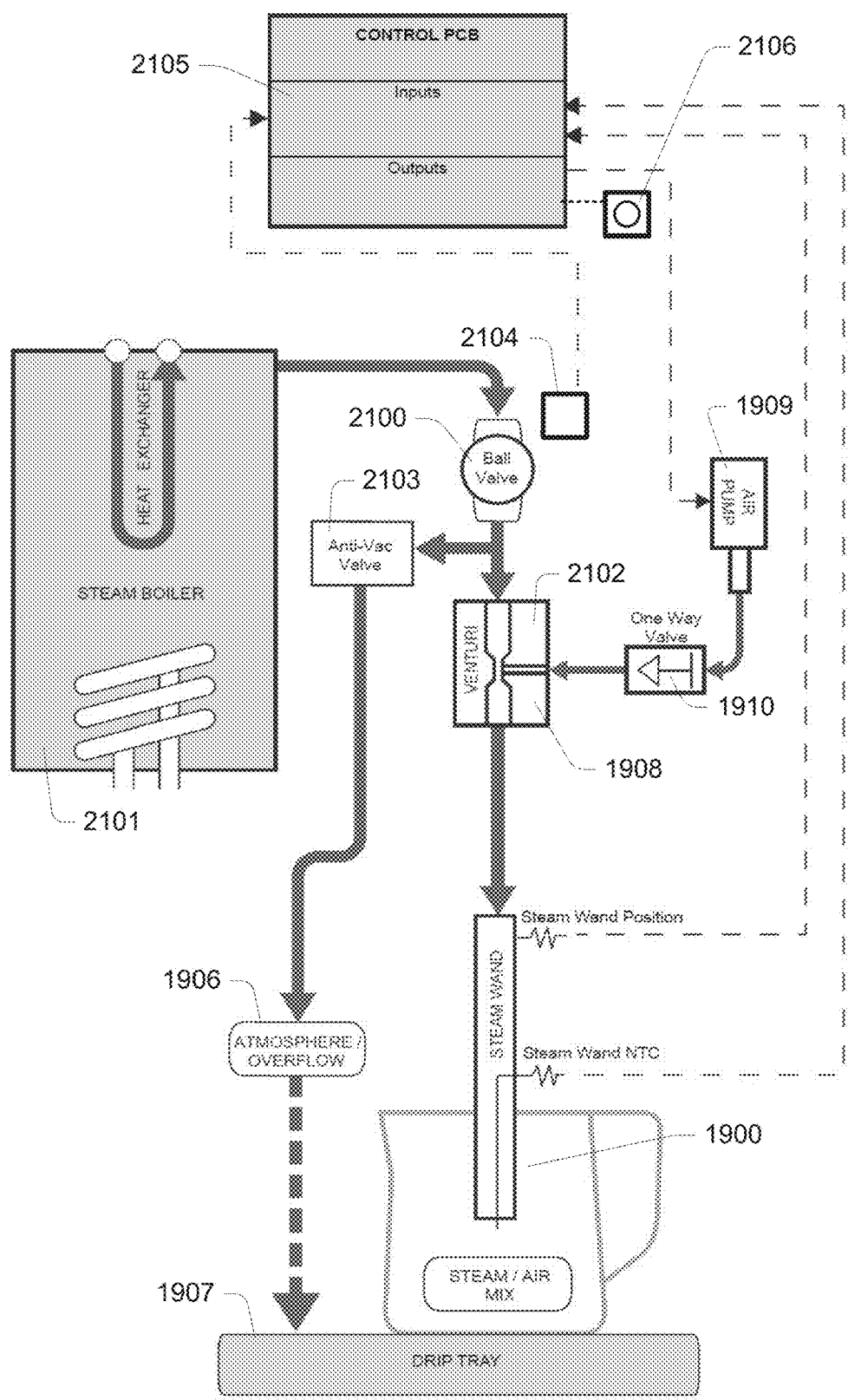
FIG. 21 is a schematic diagram of a further embodiment of the steam wand assembly, using a ball valve and anti-vacuum valve.

As shown in FIG. 21, a manually operated valve such as a ball valve 2100 is used to provide the user with control over the steam output of the steam boiler 2101. Steam flowing through the ball valve 2100 is delivered to the venturi 2102. An anti-siphon or anti-vacuum valve 2103 is interposed between the ball valve 2100 and the venturi 2102. The anti-vacuum valve 2103 prevents vacuum pressure above the venturi from allowing ingress of fluid into the ball valve, boiler or other aspects of the machine that are upstream from the valve 2103. The ball valve 2100 is associated with a sensor 2104. The sensor transmits the operative position of the ball valve of the control PCB 2105. Having information regarding the ball valve position from the sensor 2104, the control PCB can use this information to illuminate a warning light 2106 on an exterior surface of the steaming or espresso making machine that indicates, for example, that the steam pathway to the wand is open. In some embodiments, when the sensor 2104 indicates that the ball valve is open, the control PCB 2105 will now allow power to be delivered to the steam boiler 2101. This prevents inadvertent operation of the boiler when first turning on the machine and the ball valve 2100 is open.

Figure 22:
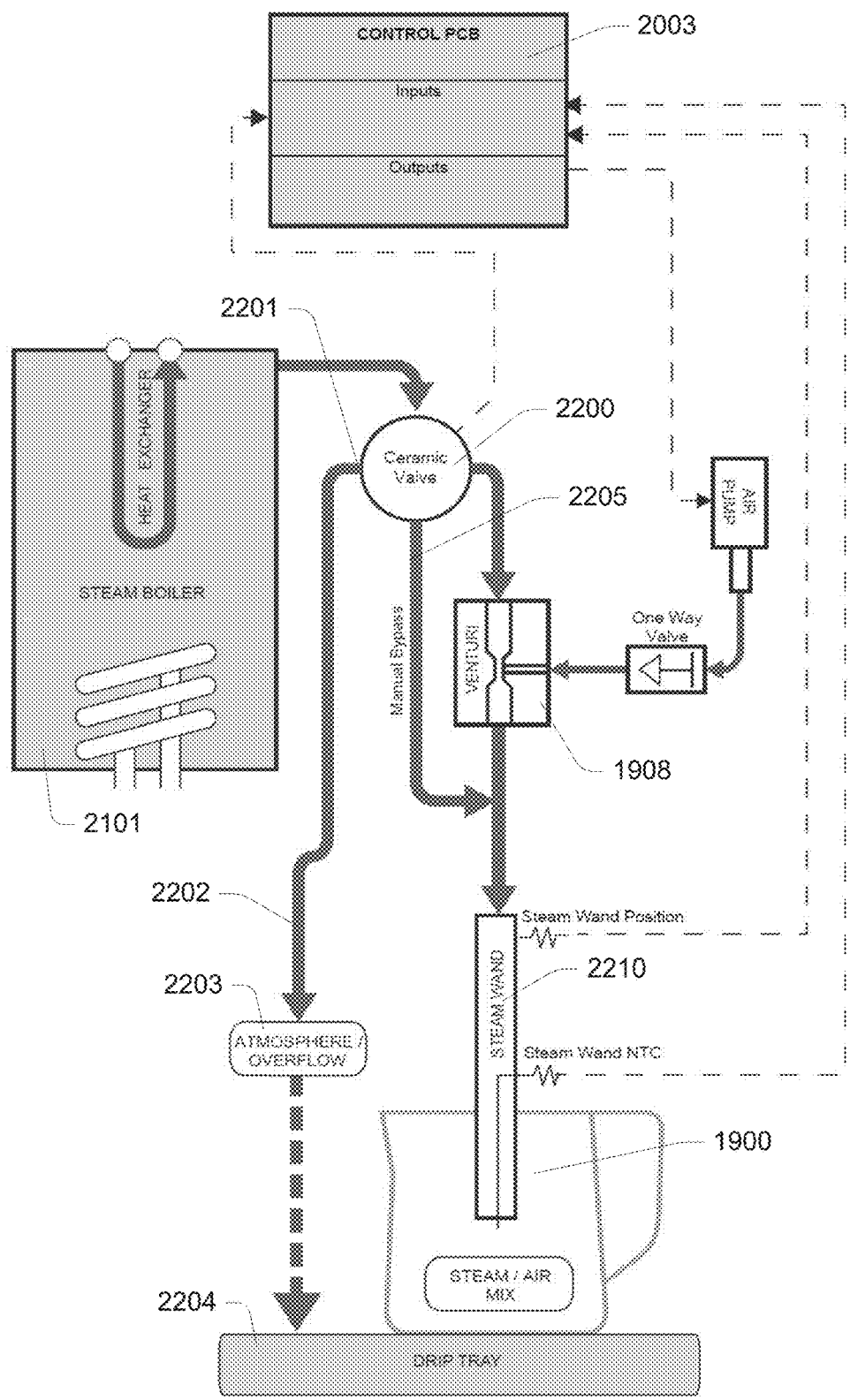
FIG. 22 is a schematic diagram of a further embodiment of the steam wand assembly, using a ceramic type valve.

As shown in FIG. 22, a multi-ported ceramic valve 2200 may be used in place of the ball valve 2100 depicted in FIG. 21. The ceramic valve provides additional flexibility by allowing for numerous different flow pathways to be controlled from a single rotating valve stem, being the valve stem associated with the ceramic valve 2200. Thus, the ceramic style valve 2200 can incorporate an overflow discharge port 2201 that leads to an overflow pathway 2202 that discharges either to atmosphere 2203 or more particularly to the drip tray 2204 that lies below the jug 1900. The rotating ceramic style valve 2200 can also incorporate a manual bypass flow path 2205 that allows steam from the boiler 2101 to bypass the venturi 1908. Because the venturi is essentially a restriction in the flow path, the manual bypass flow path 2205 is capable of delivering a greater volume of steam to the steam wand 2210.

Figure 23:
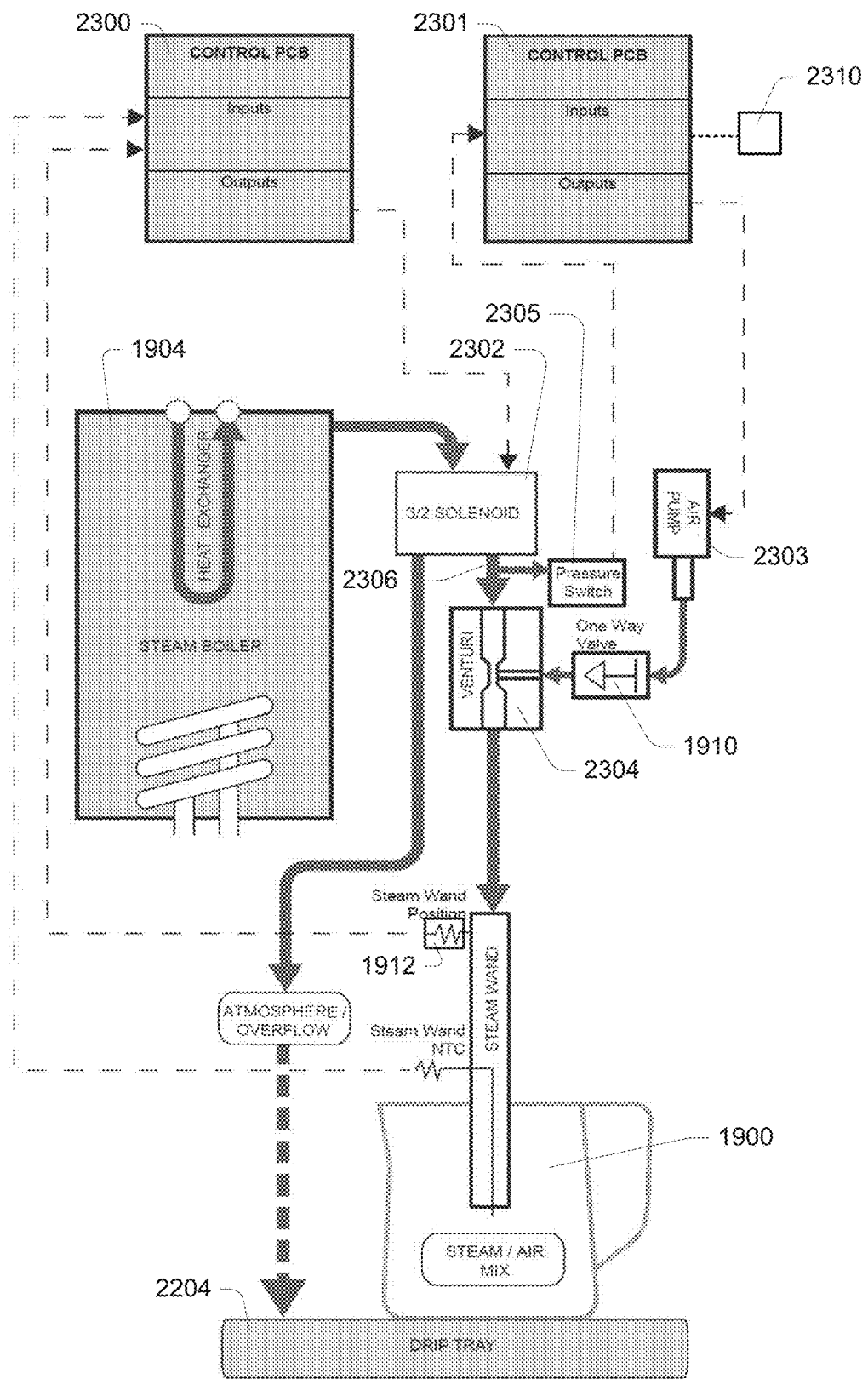
FIG. 23 is a schematic diagram of a further embodiment of the steam wand assembly, using two independent controllers.

As shown in FIG. 23, two separate control PCBs 2300, 2301 are used in the control of the primary steam solenoid 2302 and the air pump 2303 that delivers air to the venturi 2304. In one embodiment, a pressure detecting sensor or switch 2305 detects pressure in the line 2306 between the solenoid 2302 and the venturi 2304. When the pressure sensor or switch detects the presence of pressure, a signal is sent to the input of the second PCB 2301. The second PCB 2301 interprets that signal as a command to supply power to the air pump 2303. In other embodiments, the pressure switch 2305 is not required.

Instead, a user operated control 2310 provides the second control PCB 2301 with a signal or switch state that is interpreted as a command to supply power to the air pump 2303. If required, the user operated switch 2310 can be disabled in other ways when the primary solenoid 2302 is closed, Interpretation It would be appreciated that, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment.

Unless specifically stated otherwise, as apparent from the following discussions, it is appreciated that throughout the specification discussions utilizing terms such as "processing", "computing", "calculating", "determining" or the like, can refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken is included.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Similarly, it is to be noticed that the term "coupled", when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may refer to the same embodiment. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description. Although the invention has been described with reference to specific examples, it will be appreciated by those skilled in the art that the invention may be embodied in many other forms.

The invention claimed is:

1. A coffee making device comprising: a body within which is an internal water tank that is removable
a drip tray;
the water tank defining a reservoir and having a front wall, the water tank further comprising a diversion channel that dispenses water tank overflow into the drip tray, wherein the diversion channel is disposed adjacent the front wall of the water tank and is defined at least in part by a partial height wall disposed inside the water tank, the partial height wall located between the reservoir and the front wall of the water tank, wherein the diversion channel directs the water tank overflow to the drip tray where the drip tray is below the partial height wall of the water tank, with the diversion channel being disposed within a confine of the water tank; and
further wherein the water tank has a maximum fill height, and an aperture in fluid communication with the diversion channel is located at the maximum fill height.

2. The device of claim 1, wherein:
the body has a fill aperture through which the water tank can be filled with water.

3. The device of claim 2, wherein:
the fill aperture is located on a top of the body.

4. The device of claim 2, wherein:
the fill aperture is located on a front portion of a top of the body.

5. The device of claim 1, wherein:
the drip tray is removable and front loading.

6. The device of claim 1, wherein:
the water tank is inserted into the body through an aperture in a rear of the body.

7. The device of claim 1, wherein:
the water tank is inserted into the body through an aperture in a side of the body.

8. The device of claim 1, wherein:
the diversion channel is vertical.

9. The device of claim 1, wherein:
the diversion channel comprises a partial height wall.

10. The device of claim 9, wherein the partial height wall is located between a reservoir and a front-most wall of the water tank.

11. The device of claim 1, wherein:
the diversion channel discharges into a rear of the drip tray.

12. The device of claim 1, further comprising:
an audible or visual feedback for establishing a completion of a water filling operation.

13. A coffee making device having a body within which is an internal water tank that is removable, comprising:
a drip tray;
the water tank further comprising a diversion channel that dispenses an overflow into the drip tray,
wherein the water tank has a maximum fill height, and an aperture in fluid communication with the diversion channel is located at the maximum fill height; and
wherein the water tank is retained in the body by a lock assembly;
the lock assembly having an even-center locked configuration that is adapted to be rotated into an unlocked configuration; and
wherein the lock assembly has a camming lobe that draws the tank into the body.

14. The device of claim 13, wherein:
the lock assembly is mounted onto the body.

15. The device of claim 1, wherein:
the tank has a spring biased release valve that cooperates with an abutment surface located on the body, an engagement of the valve with the abutment surface acting to open the valve.

16. The device of claim 1, wherein:
the water tank is retained in the body by a lock assembly;
the tank has a spring biased release valve that cooperates with an abutment surface located on the body, an engagement of the valve with the abutment surface acting to open the valve.

17. The device of claim 15, wherein:
the water tank is inserted into the body through an aperture in a rear of the body.

18. The device of claim 17, wherein:
the body has a fill aperture through which the tank can be filled.

19. The device of claim 18, wherein:
the fill aperture is located on a top of the body.

20. A coffee making device comprising:
a body within which is an internal water tank that is removable;
a drip tray;
the internal water tank further comprising a front wall, a reservoir, and a diversion channel within the internal water tank that dispenses water tank overflow into the drip tray, the diversion channel defined by a partial height wall located between the reservoir and the front wall; and
wherein the diversion channel is formed internally within the internal water tank with all of the diversion channel being disposed within the confines of the internal water tank, and wherein the diversion channel includes an aperture defined by the partial height wall and disposed at a maximum fill height to provide direct fluid communication for the water tank overflow between the maximum fill height, and the diversion channel, and to the drip tray where the drip tray is below the partial height wall and the internal water tank.

21. The coffee making device of claim 20, wherein the diversion channel is arranged to direct water tank overflow vertically into a rear portion of the drip tray.

* * * * *